United States Patent
Calvet et al.

(10) Patent No.: US 8,953,934 B2
(45) Date of Patent: Feb. 10, 2015

(54) MEMS ACTUATOR ALIGNMENT

(71) Applicant: DigitalOptics Corporation MEMS, Arcadia, CA (US)

(72) Inventors: Robert J. Calvet, Pasadena, CA (US); Roman C. Gutierrez, Arcadia, CA (US); Guiqin Wang, Arcadia, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 0 days.

(21) Appl. No.: 13/975,122

(22) Filed: Aug. 23, 2013

(65) Prior Publication Data

US 2013/0343740 A1 Dec. 26, 2013

Related U.S. Application Data

(63) Continuation of application No. 13/079,681, filed on Apr. 4, 2011, now Pat. No. 8,521,017, which is a continuation-in-part of application No. 12/946,680, filed on Nov. 15, 2010, now Pat. No. 8,358,925.

(51) Int. Cl.
| | |
|---|---|
| *G03B 3/10* | (2006.01) |
| *G02B 7/04* | (2006.01) |
| *G02B 7/00* | (2006.01) |
| *G02B 7/08* | (2006.01) |
| *G03B 13/34* | (2006.01) |

(52) U.S. Cl.
CPC ........ *G02B 7/04* (2013.01); *G02B 7/003* (2013.01); *G02B 7/08* (2013.01); *G03B 13/34* (2013.01)
USPC ........................................................ 396/133

(58) Field of Classification Search
USPC ............................................. 396/133, 54–55
See application file for complete search history.

(56) References Cited

U.S. PATENT DOCUMENTS

| | | | |
|---|---|---|---|
| 2,774,001 A | 12/1956 | Riedel | |
| 4,333,722 A | 6/1982 | Lee | |
| 4,384,778 A | 5/1983 | Lee et al. | |
| 4,408,857 A | 10/1983 | Frank | |
| 4,496,217 A | 1/1985 | Aoyagi | |

(Continued)

FOREIGN PATENT DOCUMENTS

| | | |
|---|---|---|
| EP | 1959284 | 8/2008 |
| EP | 2264507 | 12/2010 |

(Continued)

OTHER PUBLICATIONS

Mingching et al., Development of tracking and focusing micro actuators for dual-stage optical pick-up head, Journal of Optics, May 2006, pp. 323-329.*

(Continued)

*Primary Examiner* — Clayton E LaBalle
*Assistant Examiner* — Kevin Butler
(74) *Attorney, Agent, or Firm* — Haynes & Boone LLP

(57) ABSTRACT

A method for aligning an actuator device relative to an adjacent component, such as a rear cover of an actuator module or a stationary lens, includes disposing a plurality of radially extending tabs around an outer periphery of the actuator device, disposing a corresponding plurality of pairs of raised mounting features on a front surface of the adjacent component, each pair defining a slot having sidewalls that are complementary in configuration to respective sidewalls of corresponding ones of the tabs, and inserting respective ones of the tabs into corresponding ones of the slots.

24 Claims, 38 Drawing Sheets

(56) References Cited

U.S. PATENT DOCUMENTS

| | | | |
|---|---|---|---|
| 4,716,432 A | 12/1987 | Stephany | |
| 4,860,040 A | 8/1989 | Tamamura et al. | |
| 5,150,260 A | 9/1992 | Chigira | |
| 5,386,294 A | 1/1995 | Ototake et al. | |
| 5,699,621 A | 12/1997 | Trumper et al. | |
| 5,825,560 A | 10/1998 | Ogura et al. | |
| 5,867,302 A | 2/1999 | Fleming | |
| 5,986,826 A | 11/1999 | Kosaka et al. | |
| 5,995,688 A | 11/1999 | Aksyuk et al. | |
| 6,033,131 A | 3/2000 | Ghosh et al. | |
| 6,068,801 A | 5/2000 | Bodö et al. | |
| 6,205,267 B1 | 3/2001 | Aksyuk et al. | |
| 6,239,473 B1 | 5/2001 | Adams et al. | |
| 6,262,827 B1 | 7/2001 | Ueda et al. | |
| 6,291,875 B1 | 9/2001 | Clark et al. | |
| 6,392,703 B1 | 5/2002 | Uchino et al. | |
| 6,426,777 B1 | 7/2002 | Sato | |
| 6,497,141 B1 | 12/2002 | Turner et al. | |
| 6,535,311 B1 | 3/2003 | Lindquist | |
| 6,675,671 B1 | 1/2004 | Jokiel, Jr. et al. | |
| 6,679,055 B1 | 1/2004 | Ellis | |
| 6,806,991 B1 | 10/2004 | Sarkar et al. | |
| 6,847,907 B1 | 1/2005 | Novotny | |
| 6,850,675 B1 | 2/2005 | Calvet et al. | |
| 6,914,635 B2 | 7/2005 | Ostergard | |
| 6,950,570 B1 | 9/2005 | Novotny | |
| 6,958,777 B1 | 10/2005 | Pine | |
| 7,027,206 B2 | 4/2006 | Mochizuki | |
| 7,038,150 B1 | 5/2006 | Polosky et al. | |
| 7,113,688 B2 | 9/2006 | Calvet et al. | |
| 7,148,603 B1 | 12/2006 | Garcia et al. | |
| 7,154,199 B2 | 12/2006 | Yasuda | |
| 7,190,854 B1 | 3/2007 | Novotny et al. | |
| 7,266,272 B1 | 9/2007 | Calvet et al. | |
| 7,285,879 B2 | 10/2007 | Osaka | |
| 7,359,131 B1 | 4/2008 | Gutierrez et al. | |
| 7,372,074 B2 | 5/2008 | Milne et al. | |
| 7,436,207 B2 | 10/2008 | Rogers et al. | |
| 7,477,842 B2 | 1/2009 | Gutierrez | |
| 7,545,591 B1 | 6/2009 | Tong et al. | |
| 7,555,210 B2 | 6/2009 | Calvet | |
| 7,557,470 B2 | 7/2009 | Culpepper et al. | |
| 7,579,848 B2 | 8/2009 | Bottoms et al. | |
| 7,586,702 B1 | 9/2009 | Huang et al. | |
| 7,589,912 B2 | 9/2009 | Chen | |
| 7,645,627 B2 | 1/2010 | Christenson et al. | |
| 7,646,969 B2 | 1/2010 | Calvet et al. | |
| 7,705,909 B2 | 4/2010 | Ishizawa et al. | |
| 7,720,366 B2 | 5/2010 | Iwasaki et al. | |
| 7,838,322 B1 | 11/2010 | Vargo et al. | |
| 7,855,489 B2 | 12/2010 | Hirano | |
| 7,872,394 B1 | 1/2011 | Gritters et al. | |
| 7,990,628 B1 | 8/2011 | Calvet et al. | |
| 8,004,780 B2 | 8/2011 | Gutierrez et al. | |
| 8,098,985 B2 * | 1/2012 | Tseng et al. | 396/133 |
| 8,178,936 B2 | 5/2012 | Zhe et al. | |
| 8,269,395 B2 | 9/2012 | He et al. | |
| 8,299,598 B2 | 10/2012 | Moden | |
| 2001/0004420 A1 | 6/2001 | Kuwana et al. | |
| 2002/0006687 A1 | 1/2002 | Lam | |
| 2002/0070634 A1 | 6/2002 | Tai et al. | |
| 2002/0105699 A1 | 8/2002 | Miracky et al. | |
| 2002/0125789 A1 | 9/2002 | Brandt | |
| 2002/0130586 A1 | 9/2002 | Mao et al. | |
| 2003/0026547 A1 | 2/2003 | Trzecieski | |
| 2003/0048036 A1 | 3/2003 | Lemkin | |
| 2003/0062422 A1 | 4/2003 | Fateley et al. | |
| 2003/0063838 A1 | 4/2003 | Hagood et al. | |
| 2003/0076421 A1 | 4/2003 | Dutta | |
| 2003/0086751 A1 * | 5/2003 | Culpepper | 403/52 |
| 2003/0210116 A1 | 11/2003 | Lane et al. | |
| 2004/0048410 A1 | 3/2004 | O'Brien et al. | |
| 2004/0066494 A1 | 4/2004 | Lee et al. | |
| 2004/0136680 A1 | 7/2004 | Medina et al. | |
| 2004/0183936 A1 | 9/2004 | Kim et al. | |
| 2004/0184132 A1 | 9/2004 | Novotny et al. | |
| 2004/0189969 A1 | 9/2004 | Mizuno | |
| 2004/0201773 A1 | 10/2004 | Ostergard | |
| 2005/0000311 A1 | 1/2005 | Storm | |
| 2005/0002008 A1 | 1/2005 | De Weerdt et al. | |
| 2005/0002086 A1 | 1/2005 | Starkweather et al. | |
| 2005/0007489 A1 | 1/2005 | Ahn et al. | |
| 2005/0095813 A1 | 5/2005 | Zhu et al. | |
| 2005/0139542 A1 | 6/2005 | Dickensheets et al. | |
| 2005/0148433 A1 | 7/2005 | Wang et al. | |
| 2005/0156481 A1 | 7/2005 | Zhou et al. | |
| 2005/0219399 A1 | 10/2005 | Sato et al. | |
| 2005/0249487 A1 | 11/2005 | Gutierrez | |
| 2006/0028320 A1 | 2/2006 | Osaka | |
| 2006/0033938 A1 | 2/2006 | Kopf et al. | |
| 2006/0056084 A1 | 3/2006 | Araki | |
| 2006/0092514 A1 | 5/2006 | Koo et al. | |
| 2006/0153556 A1 | 7/2006 | Lee et al. | |
| 2006/0183332 A1 | 8/2006 | Kang | |
| 2006/0192858 A1 | 8/2006 | Calvet | |
| 2006/0193618 A1 | 8/2006 | Calvet | |
| 2006/0204242 A1 | 9/2006 | Gutierrez et al. | |
| 2006/0209012 A1 | 9/2006 | Hagood, IV | |
| 2006/0219006 A1 | 10/2006 | Nasiri et al. | |
| 2006/0250325 A1 | 11/2006 | Hagood et al. | |
| 2006/0252297 A1 | 11/2006 | Culpepper | |
| 2006/0277997 A1 | 12/2006 | Foster et al. | |
| 2007/0024155 A1 | 2/2007 | Calvet et al. | |
| 2007/0133976 A1 | 6/2007 | Gutierrez et al. | |
| 2008/0020573 A1 | 1/2008 | Birkmeyer et al. | |
| 2008/0044172 A1 | 2/2008 | Tang et al. | |
| 2008/0054757 A1 | 3/2008 | Aksyuk et al. | |
| 2008/0198249 A1 | 8/2008 | Tanimura et al. | |
| 2008/0240704 A1 | 10/2008 | Takahashi | |
| 2008/0279498 A1 | 11/2008 | Sampsell et al. | |
| 2008/0309191 A1 | 12/2008 | Chou et al. | |
| 2009/0031548 A1 | 2/2009 | Zaitsu | |
| 2009/0185796 A1 | 7/2009 | Tsutsumi et al. | |
| 2009/0213236 A1 | 8/2009 | Chiou et al. | |
| 2009/0244302 A1 | 10/2009 | Tsai | |
| 2009/0244668 A1 | 10/2009 | Fujino et al. | |
| 2009/0284816 A1 | 11/2009 | Davis et al. | |
| 2009/0310959 A1 | 12/2009 | Shih et al. | |
| 2010/0232777 A1 | 9/2010 | Tseng et al. | |
| 2010/0284081 A1 | 11/2010 | Gutierrez et al. | |
| 2011/0026148 A1 | 2/2011 | Tanimura et al. | |
| 2011/0317291 A1 | 12/2011 | Lee | |

FOREIGN PATENT DOCUMENTS

| | | |
|---|---|---|
| JP | 2006-297543 | 11/2006 |
| JP | 2008-010624 | 1/2008 |
| JP | 2010-145264 | 7/2010 |
| JP | 2010-167536 | 8/2010 |
| KR | 2008/0079115 | 8/2008 |
| KR | 20100059735 | 6/2010 |
| WO | WO 02/063371 | 8/2002 |
| WO | WO2008/061025 | 5/2008 |
| WO | WO2010/038229 | 4/2010 |

OTHER PUBLICATIONS

Koga et al., "Electrostatic Linear Microactuator Mechanism for Focusing a CCD Camera"; Journal of Lightwave Technology, vol. 17, No. 1: p. 43-47; Jan. 1999.

Takahashi et al.; "Switched-Layer Design for SOI Bulk Micromachined XYZ Stage Using Stiction Bar for Interlayer Electrical Connection," Journal of Microelectromechanical Systems, IEEE Service Center, US, vol. 18, No. 4, pp. 818-827, Aug. 1, 2009.

Tsuboi et al., "A Rotational Comb-Driven Micromirror with a Large Deflection Angle and Low Drive Voltage," Technical Digest. MEMS. IEEE International Conference on Microelectro Mechanical Systems, Jan. 20, 2002, pp. 532-535.

Chiu et al., "Design, Fabrication and Control of Components in MEMS-Based Optical Pickups," IEEE Transactions on Magnetics, IEEE Service Center, New York, US, vol. 17, No. 2, Feb. 1, 2007, pp. 780-784.

(56) References Cited

OTHER PUBLICATIONS

Wu et al., "Development of Tracking and Focusing Micro Actuators for Dual-Stage Optical Pick-Up Head," Journal of Optics. A, Pure and Applied Optics, Institute of Physics Publishing, Bristol, GB, vol. 8, No. 7, Jul. 1, 2006, pp. S323-5329.

Kim et al., "Integrated Micro Optical Flyinq Head with Lens Positioning Actuator for Small Form Factor Data Storage," Transducers '03. 12$^{th}$ International Conference on Solid-State Sensors, Actuators and Microsystems. Digest of Technical Papers (Cat. No. 03TH8664), vol. 1, Jan. 1, 2003, pp. 607-610.

Kwon et al., "Large Displacement Vertical Microlens Scanner with Low Driving Voltage," IEEE Photonics Technology Letters, IEEE Service Center, Piscataway, NJ, US, vol. 14, No. 11, Nov. 1, 2002.

Walker et al., "Optics & MEMS", Directed Energy Effects Branch Materials Science and Technology Division, Naval Research Laboratory, NRL/MR/6336-99/7975, Washington DC, 20375-5320, May 15, 1999.

Choo, Hyuck, "Devices, Structures, and Processes for Optical MEMS", Electrical Engineering and Computer Sciences University of California Berkeley, Technical Report No. UCB/EECS-2007-50, http://www.eecs.berkeley.edu/Pubs/TechRpts/2007/EECS-2007-50.html, May 5, 2007.

* cited by examiner

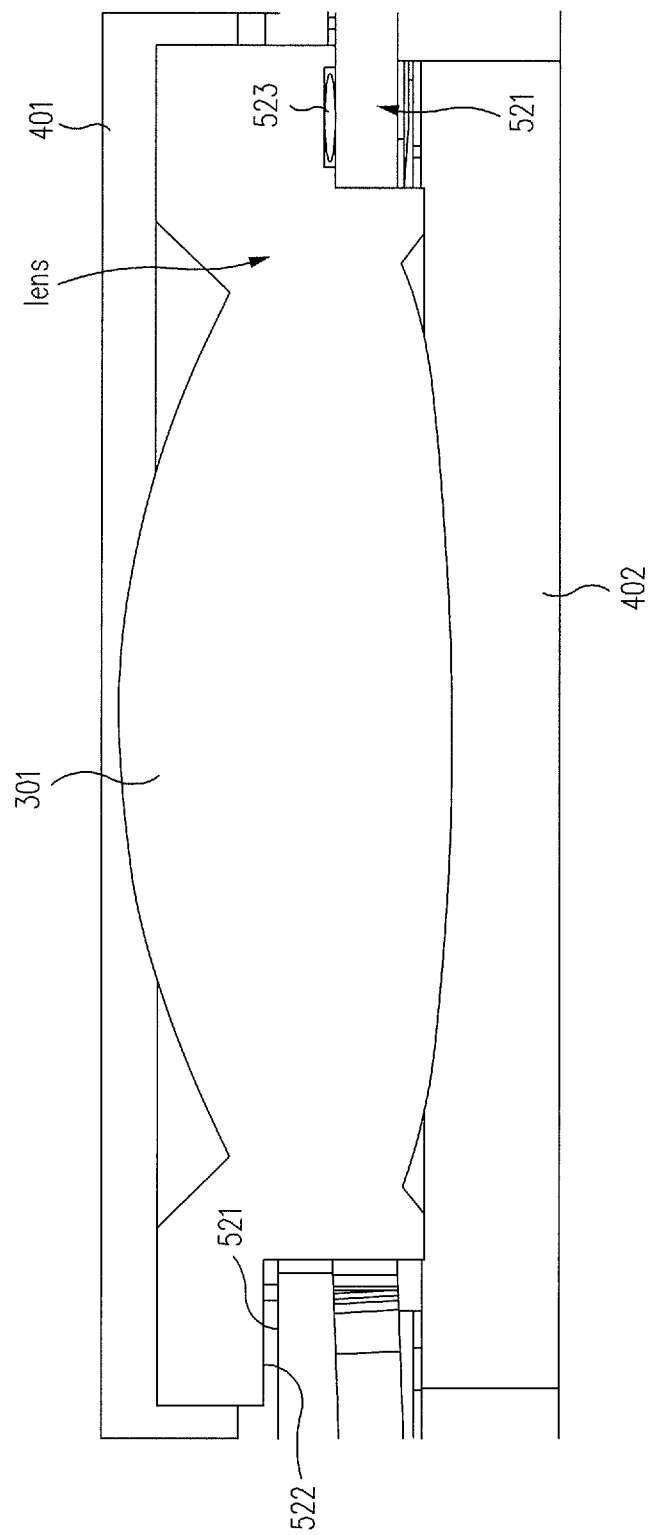

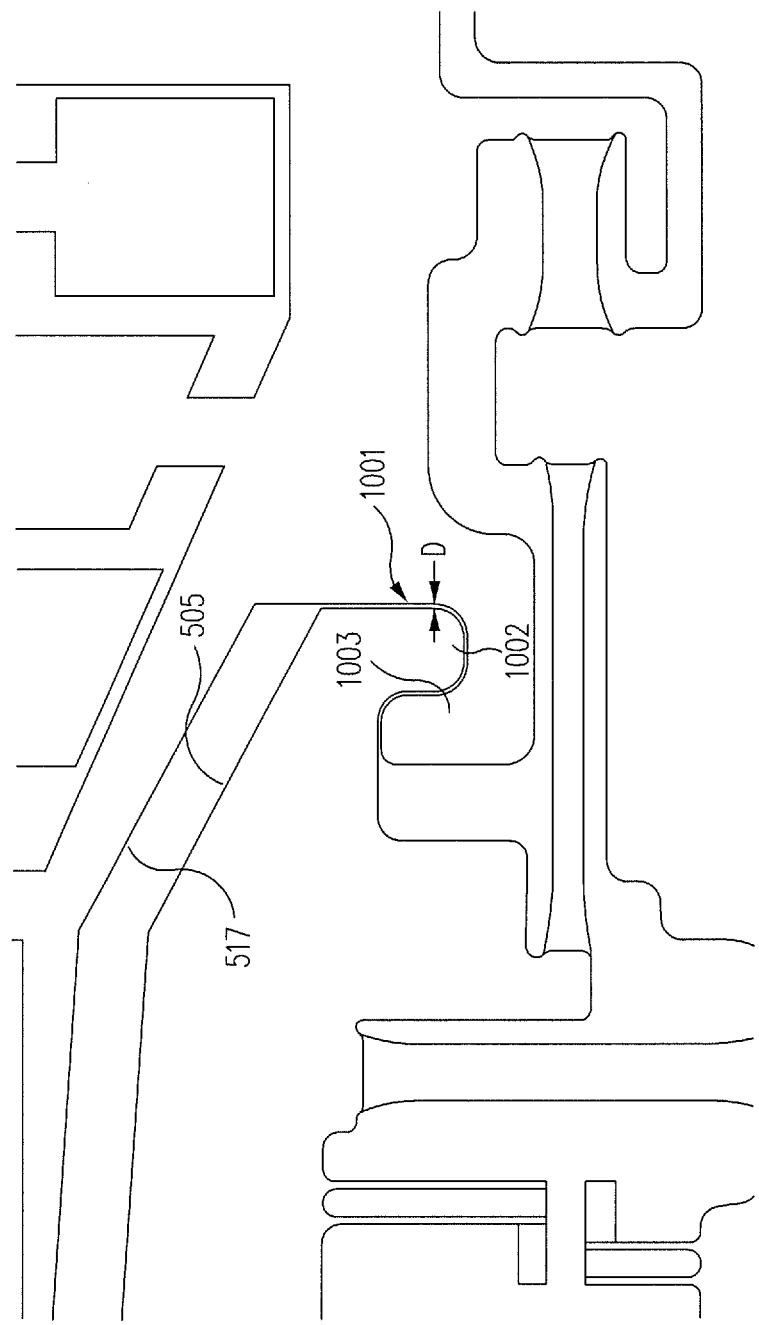

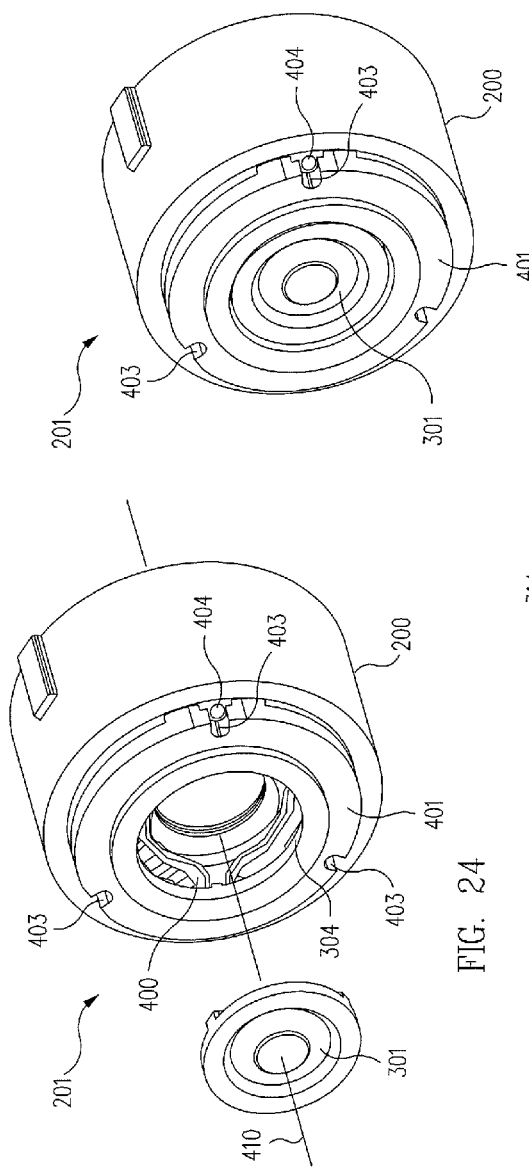
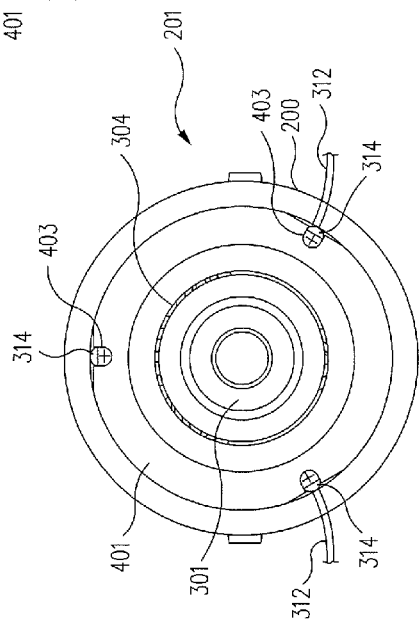
FIG. 24
FIG. 25
FIG. 26

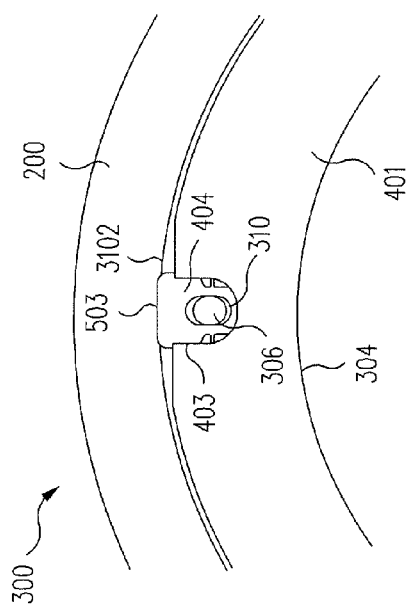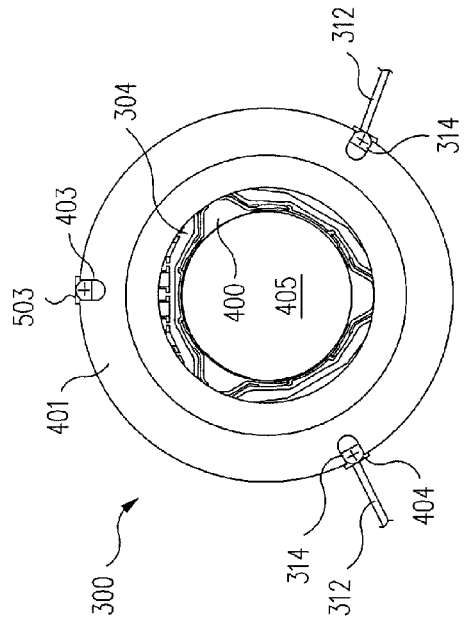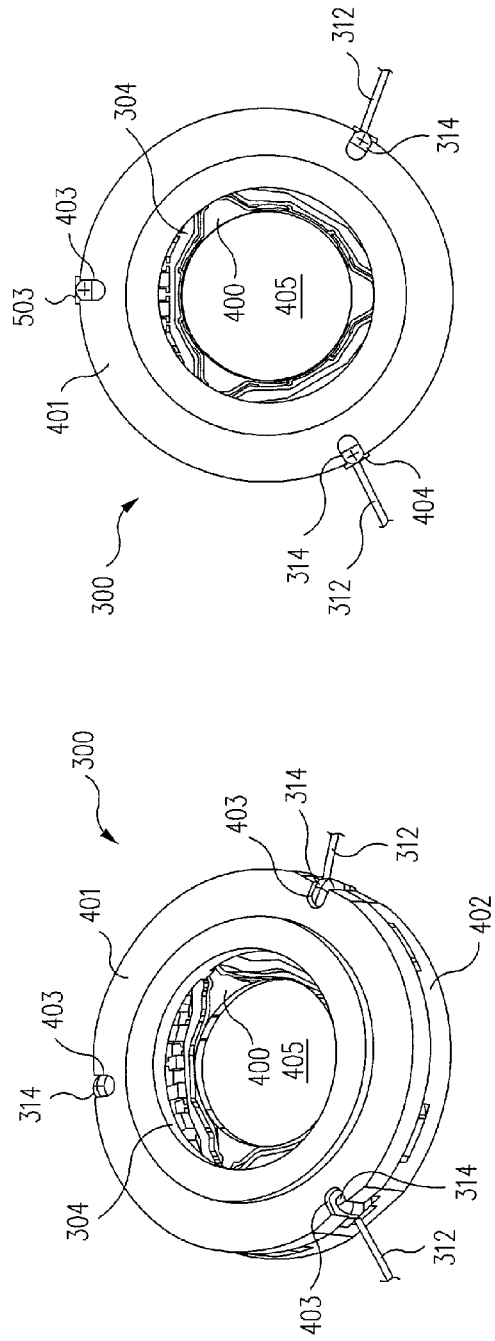

US 8,953,934 B2

MEMS ACTUATOR ALIGNMENT

CROSS REFERENCE TO RELATED APPLICATIONS

This application is a continuation of U.S. patent application Ser. No. 13/079,681, filed Apr. 4, 2011, which is a continuation in part of U.S. patent application Ser. No. 12/946,680 filed Nov. 15, 2010 (U.S. Pat. No. 8,358,925). The respective disclosures of each of these references are incorporated herein by reference in their entirety.

BACKGROUND

1. Technical Field

This disclosure relates to actuators in general, and more particularly, to lens barrels incorporating microelectromechanical systems (MEMS) actuators that are suitable for use in, for example, miniature cameras or other devices.

2. Related Art

Actuators for use in miniature cameras are well known. Such actuators typically comprise voice coils that are used to move a lens for focusing, zooming, or optical image stabilization.

Miniature cameras are used in a variety of different electronic devices. For example, miniature cameras are commonly used in cellular telephones, laptop computers, and surveillance devices. Miniature cameras may have many other applications.

It is frequently desirable to reduce the size of miniature cameras. As the size of electronic devices continues to be reduced, the size of miniature cameras that are part of such electronic devices must typically be reduced as well.

Further, it is desirable to enhance the shock resistance of such miniature cameras. As the size of miniature cameras is reduced, smaller, more delicate components must often be utilized in their construction. Since such consumer products are typically subject to substantial abuse, such as rough handling and dropping, the components of miniature cameras must be protected from the shock that is associated with such abuse.

For example, miniature cameras and other devices frequently incorporate lens barrels, i.e., elongated tubular structures containing optical elements, e.g., lenses, light apertures, shutters, imagers, and the like, typically arranged in coaxial alignment with and along an optical axis of the lens barrel. In some instances, it may be desirable to move one or more of these elements selectably with respect to the others, e.g., to achieve certain effects, such as focusing and zooming effects. Accordingly, as the size of miniature cameras and other devices incorporating lens barrels are reduced, and to the extent that they must be protected against the shocks of rough handling, a corresponding need exists for lens barrels which are reduced in size, yet which are able to withstand such abuse.

SUMMARY

In accordance with an embodiment of the present invention, lens barrels incorporating concentrically aligned linear actuator devices for use in, e.g., miniature cameras or other devices, are provided that effectively achieve the foregoing and other advantageous objectives.

In one example embodiment, a method for aligning an actuator device relative to an adjacent component, such as a rear cover of an actuator module or a stationary lens, includes disposing a plurality of radially extending tabs around an outer periphery of the actuator device, disposing a corresponding plurality of pairs of raised mounting features on a front surface of the adjacent component, each pair defining a slot having sidewalls that are complementary in configuration to respective sidewalls of corresponding ones of the tabs, and inserting respective ones of the tabs into corresponding ones of the slots.

In another embodiment, an actuator module comprises an actuator device having a plurality of radially extending tabs disposed around an outer periphery thereof and a rear cover having a corresponding plurality of pairs of raised mounting features disposed on a front surface thereof, each pair defining a slot having sidewalls that are complementary in configuration to respective sidewalls of corresponding ones of the tabs, each slot having a respective one of the tabs inserted therein.

In yet another embodiment, a lens barrel comprises an elongated barrel, an actuator device having a plurality of radially extending tabs disposed around an outer periphery thereof, and a stationary lens disposed concentrically within the barrel, the lens having a corresponding plurality of pairs of raised mounting features disposed on a front surface thereof, each pair defining a slot having sidewalls that are complementary in configuration to respective side-walls of corresponding ones of the tabs, each slot having a respective one of the tabs inserted therein such that the actuator device is aligned concentrically within the barrel and disposed at a selected angular position relative thereto.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

FIG. 6E illustrates a side view of the movable lens mounted to the actuator device, in accordance with an embodiment.

FIG. 10 illustrates a lateral snubber assembly, in accordance with an embodiment.

FIG. 24 is another exploded perspective view of the partially assembled first lens barrel, in accordance with an embodiment.

FIG. 25 is another perspective view of the partially assembled first lens barrel, in accordance with an embodiment.

FIG. 26 is a front end elevation view of the first lens barrel, fully assembled, showing wires of flexible circuit boards attached to a radial tab of the actuator device with a bolus of an electrically conductive adhesive, in accordance with an embodiment.

FIG. 31 is an enlarged partial front end elevation view of the actuator module, showing a radially extending tab on the actuator device being used both as an alignment mechanism and as an electrical contact pad of the module, in accordance with an embodiment.

FIG. 32 is a perspective view of the fully assembled actuator module, showing wires or flexible circuit boards electrically connected to tabs of the actuator device by boluses of an electrically conductive adhesive, in accordance with an embodiment.

FIG. 33 is a front end elevation view of the fully assembled actuator module, showing wires or flexible circuit boards electrically connected to the tabs of the actuator device, in accordance with an embodiment.

Embodiments of the disclosure and their advantages are best understood by referring to the detailed description that follows. It should be appreciated that like reference numerals are used to identify like elements illustrated in one or more of the figures.

DETAILED DESCRIPTION

Figure 1:
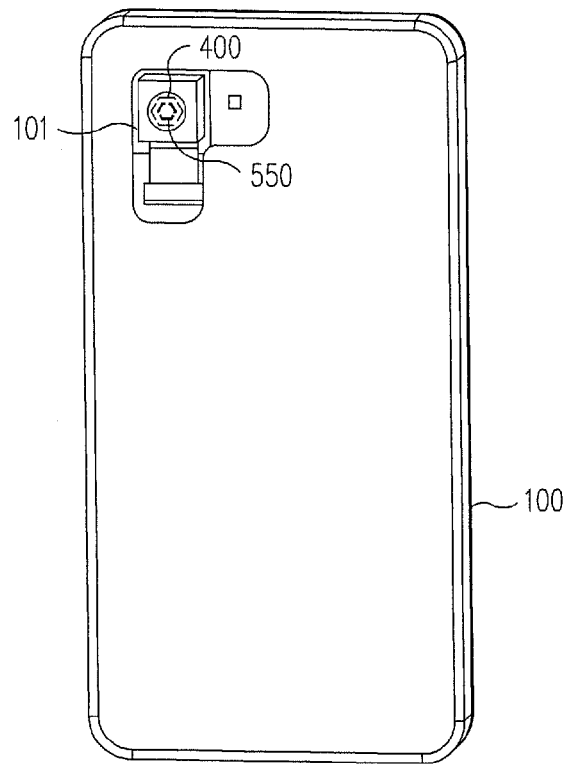
FIG. 1 illustrates an electronic device having an actuator device, in accordance with an embodiment.

An actuator device suitable for use in a wide variety of different electronic devices is disclosed in accordance with various embodiments. The actuator device may be adapted for use in a camera, such as a miniature camera, for example. The actuator device may be used to either manually or automatically focus the miniature camera. The actuator device may be used to zoom the miniature camera or to provide optical image stabilization for the miniature camera. The actuator device may be used to align the optics within the camera. The actuator device may be used for any other desired application in an electronic device or in any other device.

In accordance with one or more embodiments, the actuator device may comprise one or more MEMS actuators. The actuator device may be formed using monolithic construction. The actuator device may be formed using non-monolithic construction.

The actuator device may be formed using contemporary fabrication techniques, such as etching and micromachining, for example. Various other fabrication techniques are contemplated.

The actuator device may be formed of silicon (e.g., single crystal silicon and/or polycrystalline silicon). The actuator device may be formed of other semiconductors such as silicon, germanium, diamond, and gallium arsenide. The material of which the actuator device is formed may be doped to obtain a desired conductivity thereof. The actuator device may be formed of a metal such as tungsten, titanium, germanium, aluminum, or nickel. Any desired combination of such materials may be used.

Motion control of the actuator device and/or items moved by the actuator device is disclosed in accordance with various embodiments. The motion control may be used to facilitate a desired movement of an item while mitigating undesired movement of the item. For example, the motion control may be used to facilitate movement of a lens along an optical axis of the lens, while inhibiting other movements of the lens. Thus, the motion control may be used to facilitate movement of the lens in single desired translational degree of freedom while inhibiting movement of the lens in all other translational degrees of freedom and while inhibiting movement of the lens in all rotational degrees of freedom. In another example, the motion control may facilitate movement of the lens in all three translational degrees of freedom while inhibiting movement of the lens in all rotational degrees of freedom.

Thus, an enhanced miniature camera for standalone use and for use in electronic devices may be provided. The miniature camera is suitable for use in a wide variety of different electronic devices. For example, the miniature camera is suitable for use in electronic devices such as cellular telephones, laptop computers, televisions, handheld devices, and surveillance devices.

According to various embodiments, smaller size and enhanced shock resistance are provided. Enhanced fabrication techniques may be used to provide these and other advantages. Such fabrication techniques may additionally enhance the overall quality and reliability of miniature cameras while also substantially reducing the cost thereof.

FIG. 1 illustrates an electronic device 100 having an actuator device 400, in accordance with an embodiment. As discussed herein, the actuator device 400 may have one or more actuators 550. In one embodiment, the actuators 550 may be MEMS actuators, such as electrostatic comb drive actuators. In one embodiment, the actuators 550 may be rotational comb drive actuators.

The electronic device 100 may have one or more actuators 550 for moving any desired component thereof. For example, the electronic device 100 may have an optical device such as a miniature camera 101 that has the actuator 550 for moving optical elements such as one or more movable lenses 301 (shown in FIG. 2) that are adapted to provide focus, zoom, and/or image stabilization. The electronic device 100 may have any desired number of the actuators 550 for performing any desired functions.

The electronic device 100 may be a cellular telephone, a laptop computer, a surveillance device, or any other desired device. The miniature camera 101 may be built into the electronic device 100, may be attached to the electronic device 100, or may be separate (e.g., remote) with respect to the electronic device 100.

Figure 2:
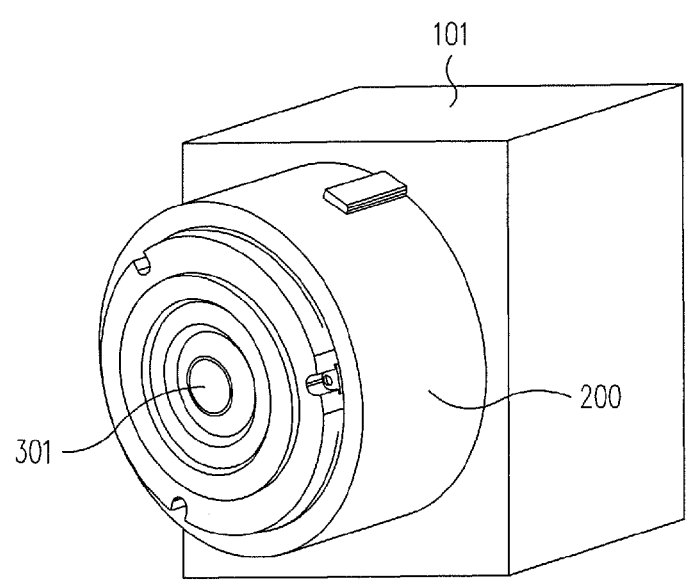
FIG. 2 illustrates a miniature camera having a lens barrel, in accordance with an embodiment.

FIG. 2 illustrates the miniature camera 101 having a lens barrel 200, in accordance with an embodiment. The lens barrel 200 may contain one or more optical elements, such as the movable lens 301, which may be moved by the actuator device 400 (shown in FIG. 1). The lens barrel 200 may have one or more optical elements which may be fixed. For example, the lens barrel 200 may contain one or more lenses, apertures (variable or fixed), shutters, mirrors (which may be flat, non-flat, powered, or non-powered), prisms, spatial light modulators, diffraction gratings, lasers, LEDs and/or detectors. Any of these items may be fixed or may be movable by the actuator device 400.

The actuator device 400 may move non-optical devices such as samples that are provided for scanning. The samples may be either biological samples or non-biological samples. Examples of biological samples include organisms, tissues, cells, and proteins. Examples of non-biological samples include solids, liquids, and gases. The actuator device 400 may be used to manipulate structures, light, sound, or any other desired thing.

The optical elements may be partially or fully contained within the lens barrel 200. The lens barrel 200 may have any desired shape, For example, the lens barrel 200 may be substantially round, triangular, rectangular, square, pentagonal, hexagonal, octagonal, or of any other shape or cross-sectional configuration. The lens barrel 200 may be either permanently or removably attached to the miniature camera 101. The lens barrel 200 may be defined by a portion of a housing of the miniature camera 101. The lens barrel 200 may be partially or completely disposed within the miniature camera 101.

Figure 3A:
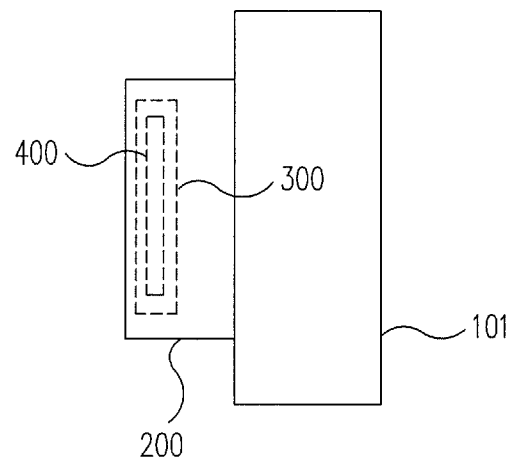
FIG. 3A illustrates the lens barrel having an actuator module disposed therein, in accordance with an embodiment.

FIG. 3A illustrates an actuator module 300 disposed within the lens barrel 200, in accordance with an embodiment. The actuator module 300 may contain the actuator device 400. The actuator device 400 may be completely contained within the lens barrel 200, partially contained within the lens barrel 200, or completely outside of the lens barrel 200. The actuator device 400 may be adapted to move optical elements contained within the lens barrel 200, optical elements not contained within the lens barrel 200, and/or any other desired items.

Figure 3B:
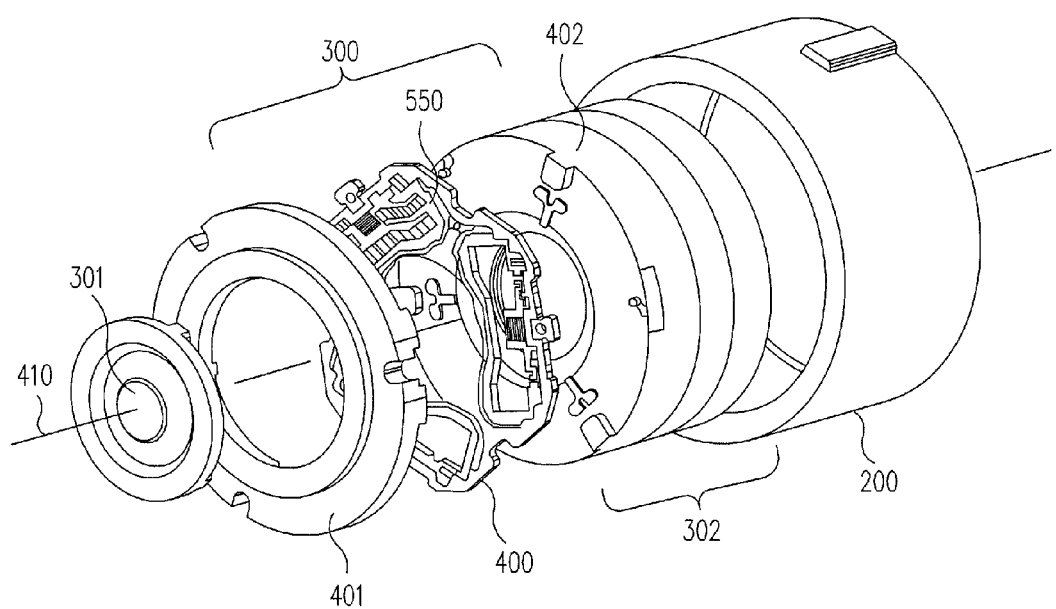
FIG. 3B illustrates the lens barrel and an actuator module in an exploded view, in accordance with an embodiment.

FIG. 3B illustrates the lens barrel 200 and the actuator module 300 in an exploded view, in accordance with an embodiment. The movable lens 301 is an example of an optical element that may be attached to the actuator device 400 and may be moved thereby. The actuator device 400 may be disposed intermediate an upper module cover 401 and a lower module cover 402.

Additional optical elements, such as fixed (e.g., stationary) lenses 302 may be provided. The additional optical elements may facilitate focus, zoom, and/or optical image stabilization, for example. Any desired number and/or type of movable (such as via the actuator device 400) and fixed optical elements may be provided.

Figure 4:
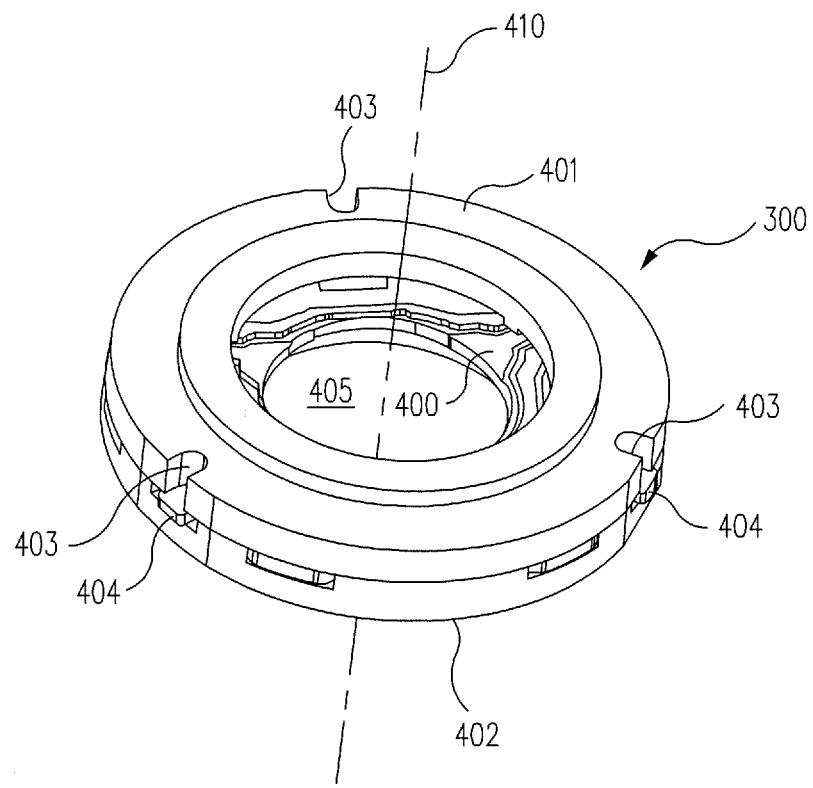
FIG. 4 illustrates the actuator module having the actuator device disposed therein, in accordance with an embodiment.

FIG. 4 illustrates the actuator module 300, in accordance with an embodiment. The actuator module 300 may be disposed partially or completely within the miniature camera 101. The actuator device 400 may be disposed partially or completely within the actuator module 300. For example, the actuator device 400 may be sandwiched substantially between an upper module cover 401 and a lower module cover 402.

The actuator module 300 may have any desired shape. For example, the actuator module 300 may be substantially round, triangular, square, rectangular, pentagonal, hexagonal, octagonal, or of any other shape or cross-sectional configuration.

In one embodiment, the lens barrel 200 may be substantially round in cross-sectional configuration and the actuator module 300 may be substantially round in cross-sectional configuration. The use of a substantially round lens barrel 200 and a substantially round actuator module 300 may facilitate an advantageous reduction in size. The reduction in size may be facilitated, for example, because round lenses are commonly preferred. The use of a substantially round lens barrel 200 and a substantially round actuator module 300 with round lenses tends to result in a reduction of wasted volume and thus tends to facilitate a reduction in size.

As discussed herein, one or more optical elements, such as the movable lens 301, may be disposed in an opening 405 (e.g., a hole) formed in the actuator module 300. Actuation of the actuators 550 may effect movement of the optical elements along their optical axis 410, for example. Thus, actuation of the actuators 550 may move one or more lenses to effect focusing or zoom, for example.

The actuator module 300 may have cutouts 403 formed therein to facilitate assembly of the actuator module 300 and alignment of the actuator device 400 contained therein. The cutouts 403 and/or electrical contacts 404 partially disposed within the cutouts 403 may be used to facilitate alignment of the actuator module 300 with respect to the lens barrel 200.

Figure 5A:
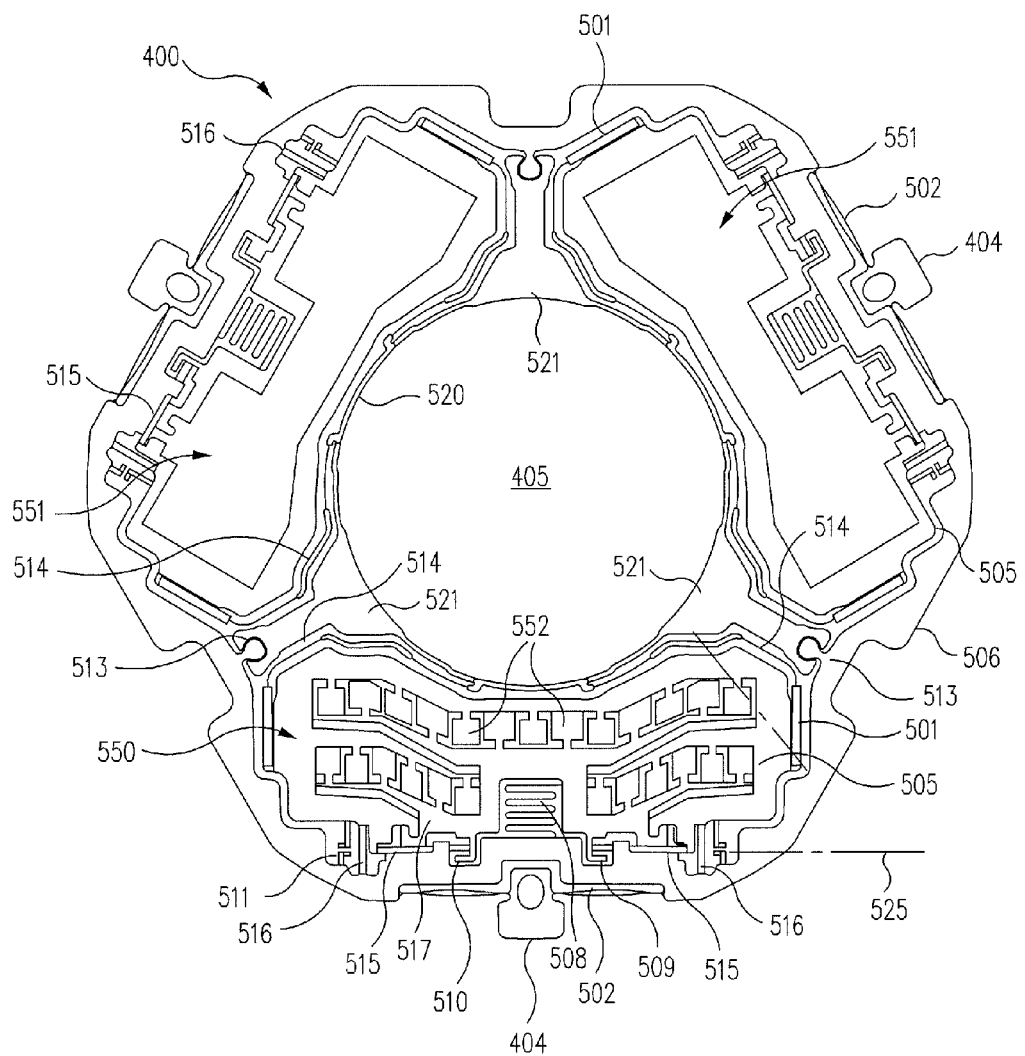
FIG. 5A illustrates a top view of the actuator device, in accordance with an embodiment.

FIG. 5A illustrates a top view of the actuator device 400 having the electrical contacts 404, the opening 405, inner hinge flexures 501, kinematic mount flexures 502, movable frames 505, an outer frame 506, serpentine contact flexures 508, deployment torsional flexures 509, deployment stops 510, flap dampers 511, ball-in-socket snubbers 513, cantilever flexures 514, motion control torsional flexures 515, outer hinge flexures 516, a fixed frame 517, a platform 520, lens pads 521, a pivot axis 525, the actuators 550, spaces 551, and blocks 552, in accordance with an embodiment.

Blocks 552 (FIG. 5A) are shown to represent teeth 560 (see FIGS. 5B and 7) of the actuator 550 in some figures. Those skilled in the art will appreciate that comb drives typically comprise a large number of very small teeth 560 that are difficult to show graphically on a drawing of this scale. For example, the actuator 550 may have between 1 and 10,000 teeth on each side thereof and may have approximately 2,000 teeth on each side thereof. Thus, in one embodiment, the blocks 552 may not represent the actual configuration of the teeth 560, but rather are shown in place of the teeth 560 to better illustrate the operation of the actuators 550, as discussed herein.

In accordance with an embodiment, the actuator device 400 may be substantially hexagonal in shape. The hexagonal shape readily facilitates placement of the actuator device 400 within the substantially round lens barrel 200. The hexagonal shape also facilitates efficient use of wafer real estate. Other shapes are contemplated.

The actuator device 400 may have a plurality of the actuators 550. Only one actuator 550 is illustrated in detail in FIG. 5A. The spaces 551 are shown in FIG. 5A for two additional actuators 550 that are not illustrated in detail. Thus, in one embodiment the actuator device 400 may have three actuators 550 disposed in a substantially radially symmetric pattern about the opening 405 such that the actuators 550 are spaced approximately 120° apart from one another. The actuator device 400 may have any desired number of the actuators 550 disposed in any desired pattern. As further examples, the actuator device 400 may have two actuators 550 spaced approximately 180° apart from one another or may have four actuators 550 spaced approximately 90° apart from one another.

As discussed herein, the actuators 550 may include one or more MEMS actuators, voice coil actuators, or any other desired type or combination of types of actuators. For example, in one embodiment, each actuator 550 may be a vertical rotational comb drive.

The actuators 550 may cooperate with one another to move a platform 520 along the optical axis 410 (FIG. 3B), which in FIG. 5A is perpendicular to the plane of the actuator device 400. The actuators 550 may cooperate with one another to move the platform 520 in a manner that maintains the platform 520 substantially orthogonal with respect to the optical axis 410 and in a manner that substantially mitigates rotation of the platform 520.

Actuation of the actuators 550 is accomplished by the application of a voltage differential between adjacent teeth 560, represented by blocks 552. Such actuation effects rotation of the actuators 550 to facilitate the herein described movement of the platform 520.

In various embodiments, the platform 520 may be adapted substantially as a ring (e.g., as shown in FIG. 5A). Other shapes are contemplated. The platform 520 may have any desired shape.

Prior to deployment, the actuator device 400 may be a substantially planar structure. For example, the actuator device 400 may be substantially formed from a single, monolithic piece of material, such as silicon. The actuator device 400 may be formed from a single die. The die may be approximately 4 to 5 millimeters across and approximately 150 microns thick, for example.

The actuator device 400 may be formed by a MEMS technique, such as milling or etching. A plurality of actuator devices 400 may be formed upon a single wafer. The overall shape or footprint of the actuator device 400 may be adapted to enhance the formation of a plurality of the actuator devices 400 on a single wafer.

Prior to operation, the fixed frame 517 of each actuator 550 may be deployed to offset the adjacent pairs of teeth 560 represented by blocks 552 with respect to one another, in accordance with an embodiment. Deployment may result in a substantially non-planar overall configuration of the actuator device 400. When deployed, each actuator 550 may have a portion thereof (e.g., the fixed frame 517) extending from the plane of the outer frame 506. The fixed frame 517 may extend from the plane of the outer frame 506 at an angle with respect thereto. Thus, when deployed, the fixed frame 517 may be substantially out-of-plane with respect to the outer frame 506.

Once deployed, the fixed frames 517 may be fixed or locked into position such that they do not move further with respect to the outer frame 506, and are angularly offset or rotated with respect to the outer frame 506 and with respect to the movable frame 505 (when the actuator 550 is not actuated). The fixed frames 517 may be mechanically fixed in position, adhesively bonded in position, or any desired combination of mechanically fixed and adhesively bonded.

Actuation of the actuator 550 may cause the movable frame 505 to rotate toward the deployed fixed frame 517 to effect desired movement of the platform 520. Motion control torsional flexures 515 and outer hinge flexures 516 cooperate to facilitate motion controlled rotation of the movable frame 505, as discussed herein. The movable frame 505 rotates about the pivot axis 525.

Figure 5B:
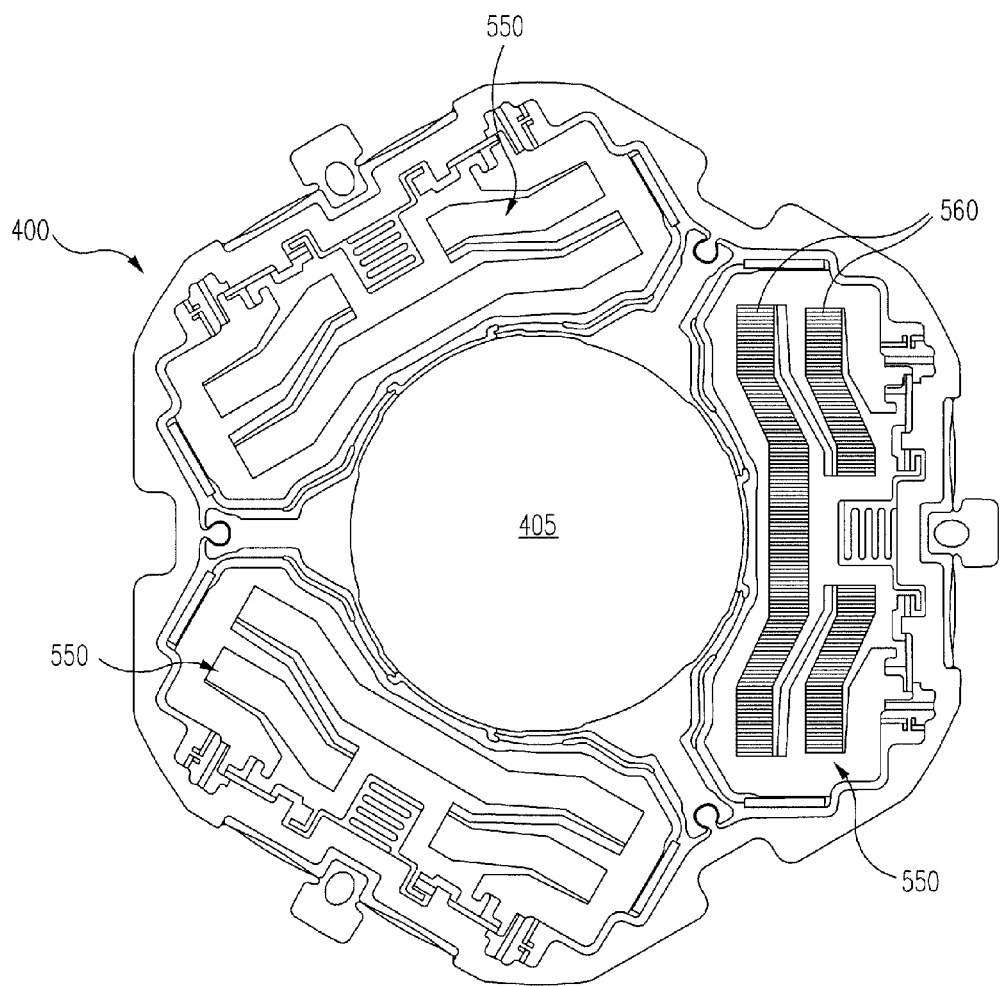
FIG. 5B illustrates a top view of the actuator device, in accordance with an embodiment.

FIG. 5B illustrates a top view of the actuator device 400 having teeth 560 shown in the actuator 550 in place of the blocks 552 representative thereof, in accordance with an embodiment. The teeth 560 shown may be considered to be reduced in number and exaggerated in size for clarity in FIG. 5B.

Figure 6A:
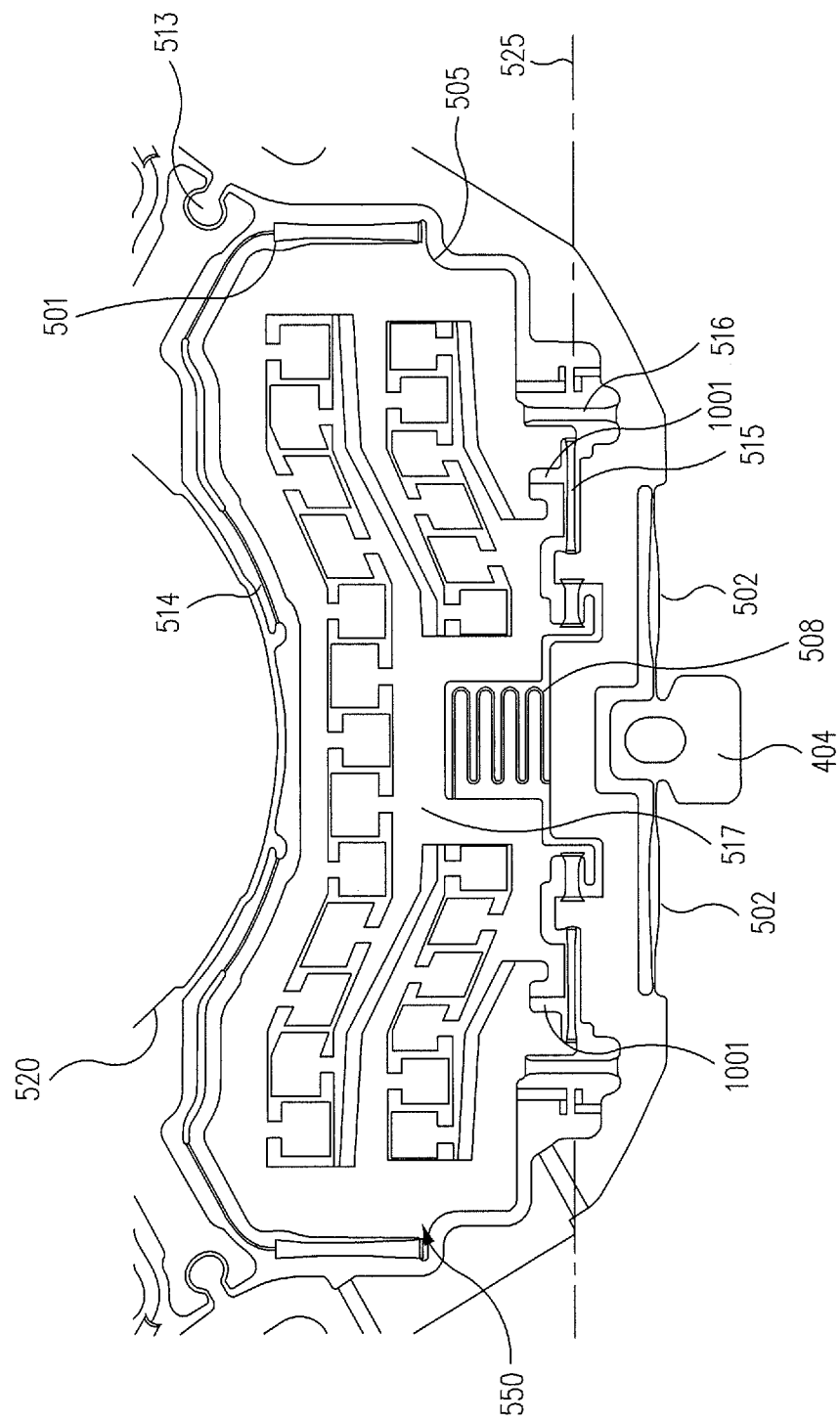
FIG. 6A illustrates a portion of the actuator device, in accordance with an embodiment.

FIG. 6A illustrates a top view of one of the actuators 550 having the inner hinge flexures 501, the ball-in-socket snubbers 513, the movable frame 505, the outer hinge flexures 516, the motion control torsional flexures 515, the cantilever flexures 514, the fixed frame 517, the pivot axis 525, the serpentine contact flexure 508, the pseudokinematic mount and electrical contact 404, and the platform 520, in accordance with an embodiment. FIG. 6A further illustrates a lateral snubber assembly 1001, which is further described herein.

The inner hinge flexure 501 cooperates with the cantilever flexure 514 to transfer desired motion from the movable frame 505 to the platform 520. Thus, actuation of the actuator 550 results in rotation of the movable frame 505, which in turn results in translation of the platform 520, as discussed herein.

The movable frame 505 may pivot on the outer hinge flexures 516 in a fashion similar to a door pivoting on its hinges. Upon the application of a shear force to the actuator device 400, one of the two outer hinge flexures 516 of the actuator 550 may be in tension while the outer hinge flexure 516 may be in compression. The two motion control torsional flexures 515 tend to mitigate undesirable buckling of the outer hinge flexure 516 in such instances.

Each actuator may be substantially disposed within a motion control mechanism that provides comparatively high lateral stiffness and comparatively soft rotational stiffness. In one embodiment, the motion control mechanism may have one or more (e.g., two) outer hinges flexures 516 and may have one or more (e.g., two) motion control torsional flexures 515. Thus, movement of the movable frame 505 may be substantially constrained to desirable rotation thereof.

In one embodiment, the motion control mechanism for one actuator 550 may comprise the outer frame 506, movable frame 505, the motion control torsional flexures 515, the outer hinge flexures 516, the inner hinge flexures 501, the cantilever flexure 514, and the platform 520. In one embodiment, the motion control mechanism may comprise all structures that tend to limit movement of the platform 520 to desired translational movement.

Each actuator 550 may be substantially contained within the motion control mechanism to substantially limit competition for real estate on the actuator device 400, in accordance with an embodiment. Since each actuator 550 and its associated motion control mechanism occupy substantially the same surface area of the actuator device 400, they do not compete for real estate. Thus, as the actuator 550 increases in size, its associated motion control mechanism may also increase in size. In certain embodiments, it is desirable to increase the size of an actuator 550 to increase the force provided thereby. In certain embodiments, it is desirable to also increase the size of the motion control mechanism to maintain its ability to desirably limit movement of the platform 520. The movable frame 550 may be considered as a portion of the motion control mechanism.

Figure 6B:
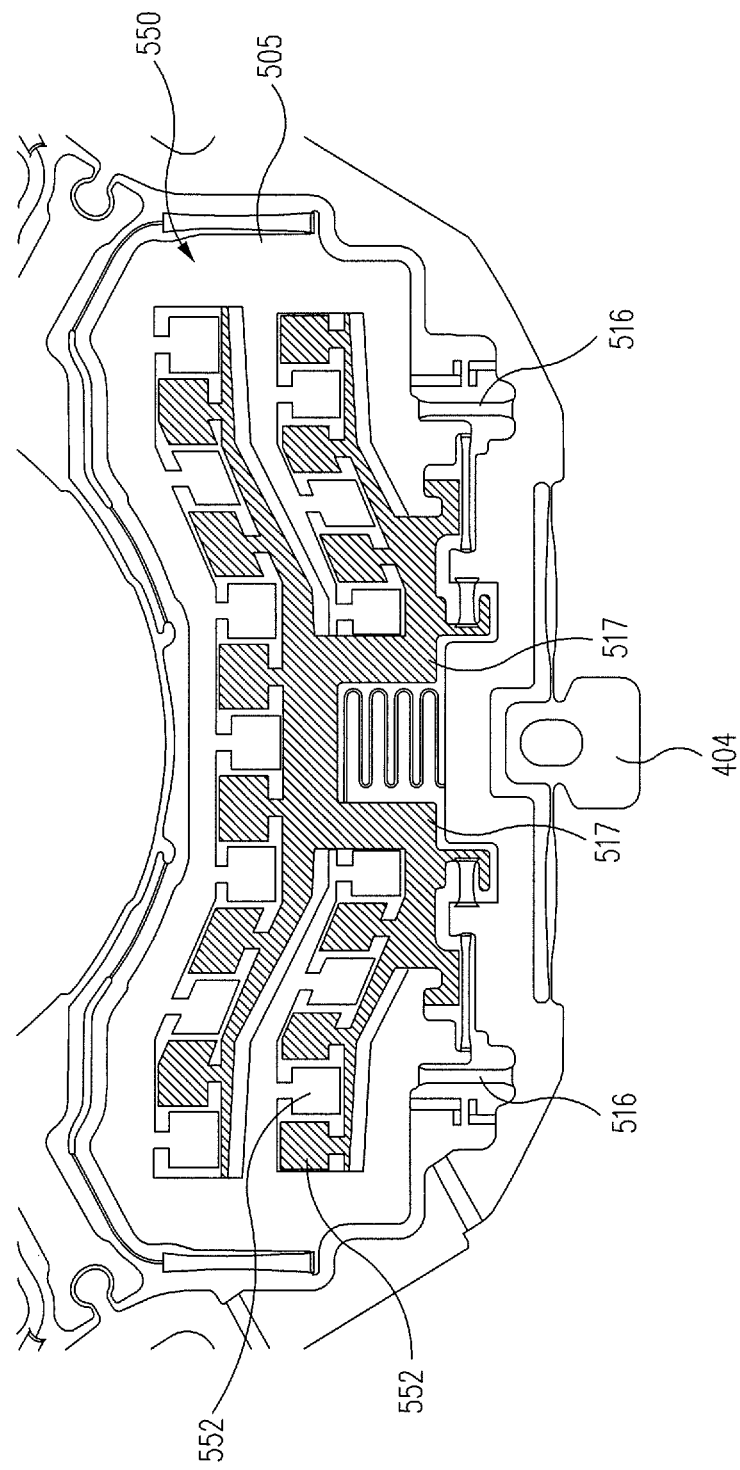
FIG. 6B illustrates a portion of the actuator device, in accordance with an embodiment.

FIG. 6B illustrates the actuator 550 showing the fixed frame 517 shaded for clarity, in accordance with an embodiment. The shaded fixed frame 517 may be deployed to a position out-of-plane of the actuator device 400 and may be fixed in this deployed position.

Figure 7:
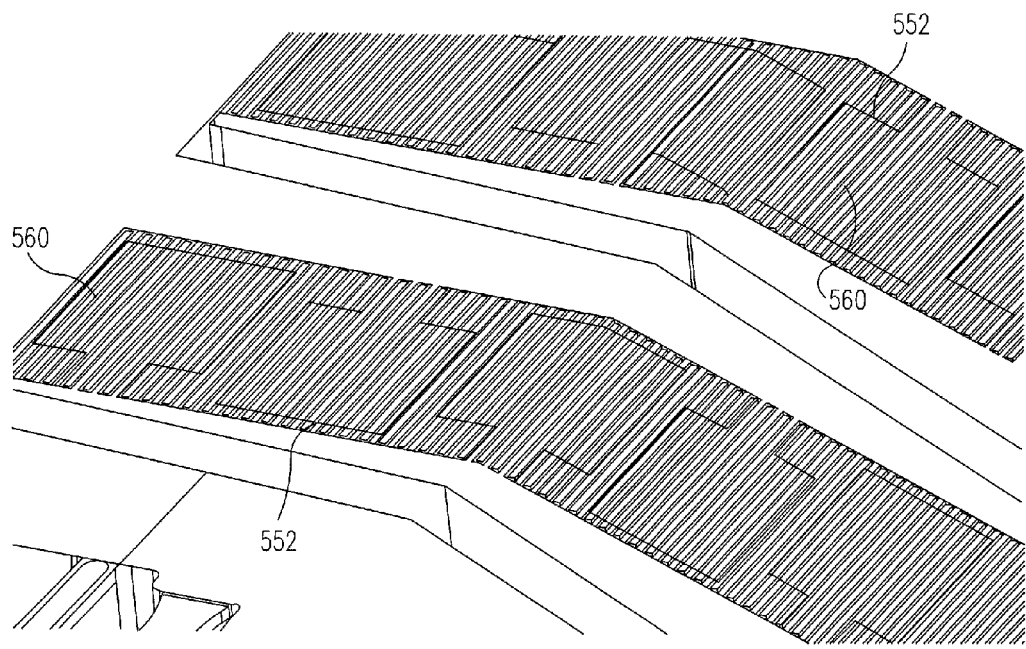
FIG. 7 illustrates portions of the actuator device, in accordance with an embodiment.

The movable frame 505 may support moving portions of the actuator 550, such as some of the teeth 560 (see FIG. 7). The fixed frame 517 may support fixed portions of the actuator 550, such as others of the teeth 560 (see FIG. 7). The application of a voltage to the actuator 550 may cause the movable frame 505 to rotate about the outer hinge flexures 516 toward the fixed frame 517. Removal or reduction of the voltage may permit a spring force applied by the inner hinge flexures 514, the outer hinge flexures 516 and the motion control torsional flexure 515 to rotate the movable frame 505 away from the fixed frame 517. Sufficient clearance between the movable frame 505 and the fixed frame 517 may be provided to accommodate such desired movement.

Figure 6C:
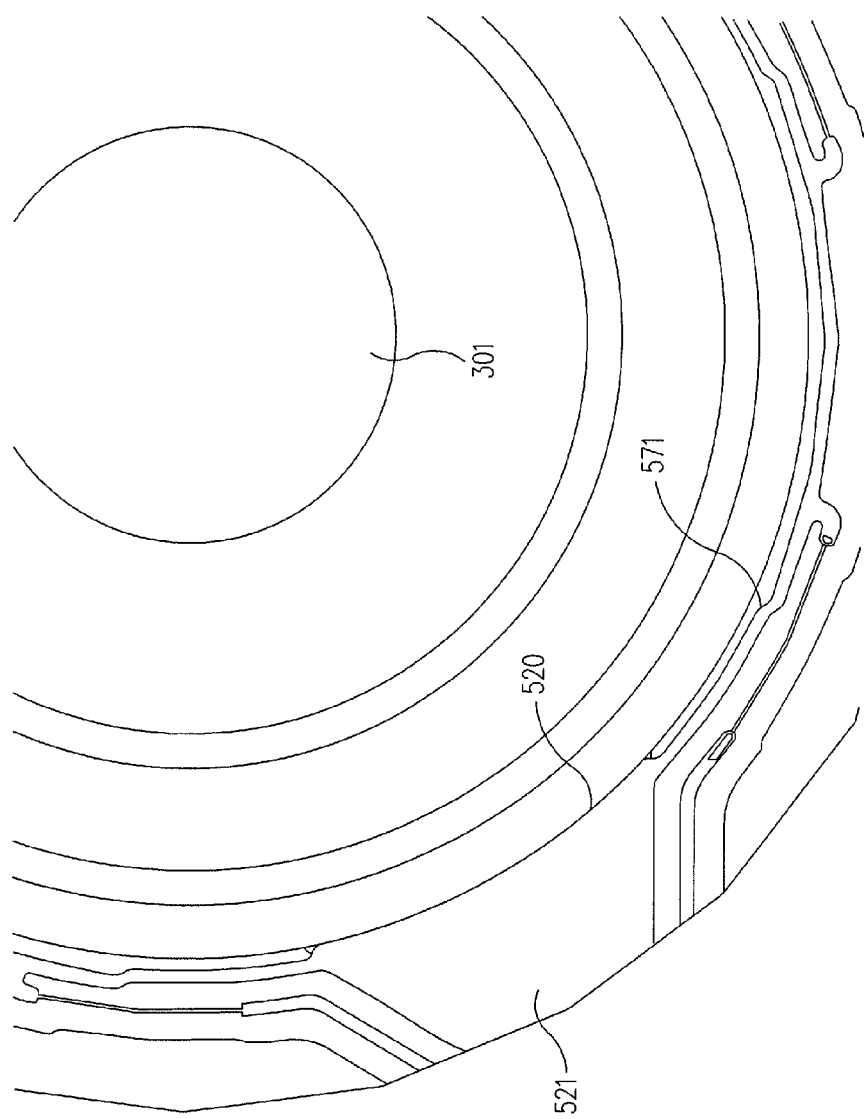
FIG. 6C illustrates a portion of a platform, in accordance with an embodiment.

FIG. 6C illustrates a portion of the platform 520 having radial variations 571, in accordance with an embodiment. In one embodiment, the radial variations 571 may be formed in the platform 520 to permit the platform 520 to expand. The radial variations 571 may be angular bends in the platform 520. Thus, an optical element such as the movable lens 301 may be inserted into the opening 405 of the platform 520, which may expand to receive the movable lens 301 and which may grip the movable lens 301. The opening 405 may expand as the radial variations 571 of the platform 520 deform (e.g., tend to straighten), so as to increase the circumference of the opening 405.

Figure 6D:
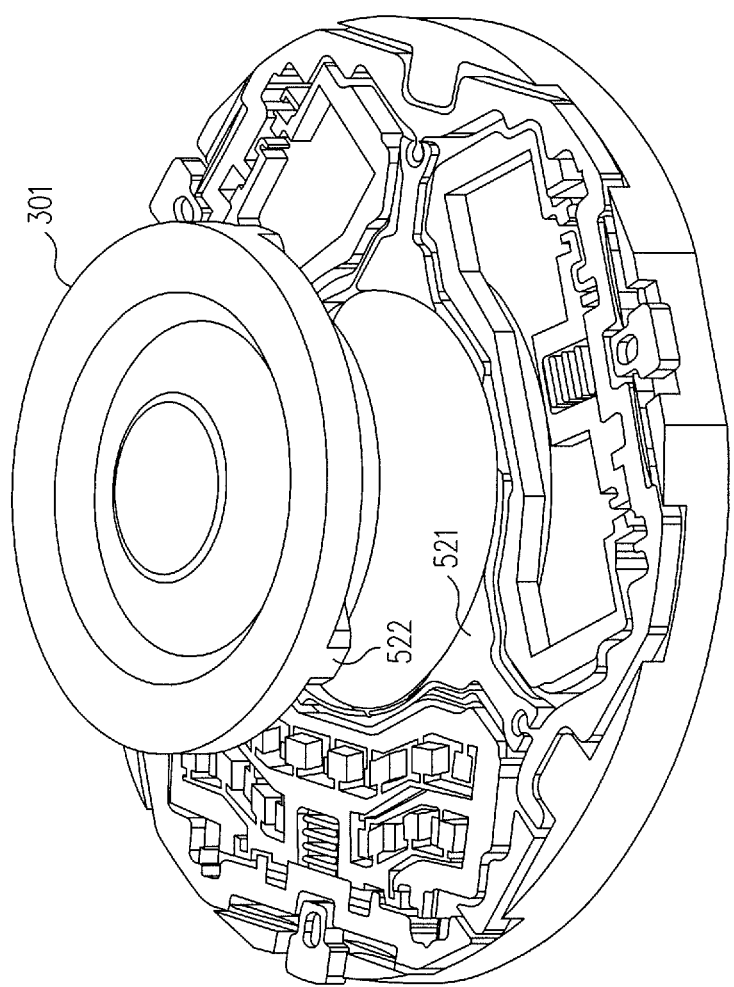
FIG. 6D illustrates a bottom view of a movable lens positioned for mounting to the actuator device, in accordance with an embodiment.

FIG. 6D illustrates a perspective view of a movable lens positioned for mounting to the actuator device 400 and FIG. 6E illustrates a side view of the movable lens 301 attached to the actuator device 400, in accordance with an embodiment. In one embodiment, the movable lens 301 may be adhesively bonded to the platform 550, such as by adhesively bonding standoffs 522 of the movable lens 301 to the lens pads 521. For example, epoxy 523 may be used to adhesively bond the movable lens 301 to the platform 520. The movable lens 301 may be supported by the lens pad 521.

FIG. 7 illustrates a portion of the actuator 550 showing blocks 552 superimposed over the teeth 560 of an actuator 550, in accordance with an embodiment. As discussed herein, the blocks 552 are representative of the teeth 560.

Figure 8:
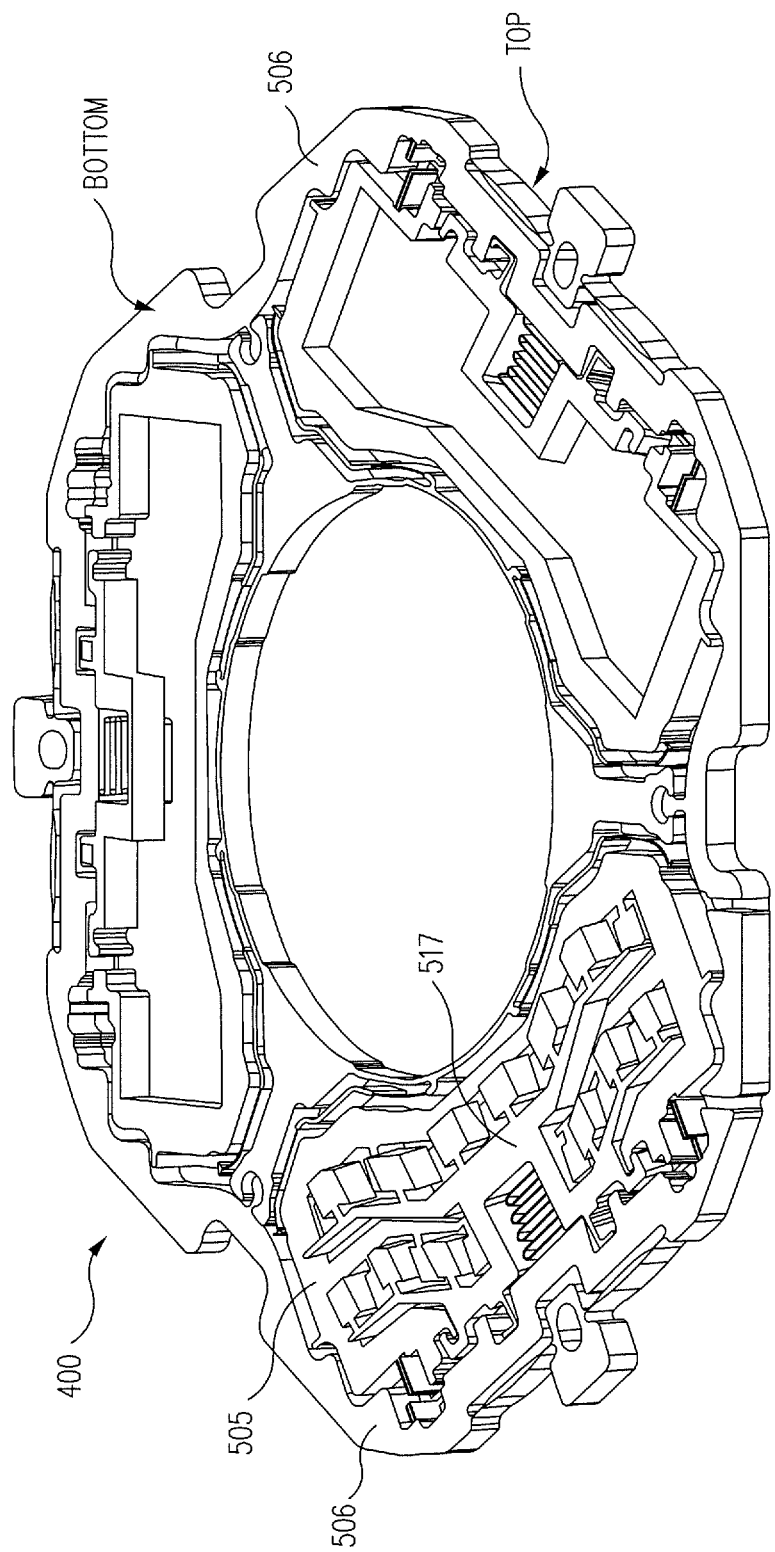
FIG. 8 illustrates a bottom view of the actuator device in a deployed configuration, in accordance with an embodiment.

FIG. 8 illustrates a bottom perspective view of the actuator device 400 in a deployed configuration, in accordance with an embodiment. In the deployed configuration the unactuated movable frame 505 is substantially in-plane with respect to the outer frame 506 and the deployed fixed frame 517 is substantially out-of-plane with respect to the outer frame 506 and the movable frame 505.

A voltage may be applied to each actuator 550 via the electrical contacts 404. For example, two of the three contacts 404 may be used to apply a voltage from the lens barrel 200 to the actuator device 400. The third contact 404 may be unused or may be used to redundantly apply one polarity of the voltage from the lens barrel 200 to the actuator device 400.

Substantially the same voltage may be applied to the three actuators 550 to result in substantially the same movement of the moving frames 505 thereof. Application of substantially the same voltage to the three actuators 550 may result in translation of the platform 520 with respect to the outer frame 506 such that the platform 520 remains substantially parallel to the outer frame 506. Thus, an optical element such as the movable lens 301 may be maintained in a desired alignment as the optical element is moved, such as along an optical axis 410 (FIG. 3B) thereof.

Substantially different voltages may be applied to the three actuators 550 to result in substantially different movements of the moving frames 505 thereof. Substantially different voltages may be applied to the three actuators 550 using the three contacts 404 and a common return. Thus, each contact 404 may apply a separately controlled voltage to a dedicated one of the three actuators 550.

The application of substantially different voltages to the three actuators 550 may result in translation of the platform 520 with respect to the outer frame 506 such that the platform tilts substantially with respect to the outer frame 506. Thus, when substantially different voltages are applied, the platform 520 does not necessarily remain substantially parallel to the outer frame. The application of different voltages to the three actuators 550 may be used to align the platform 520 to the outer frame 506, for example. The application of different voltages to the three actuators 550 may be used to facilitate optical image stabilization or lens alignment, for example.

Figure 9A:
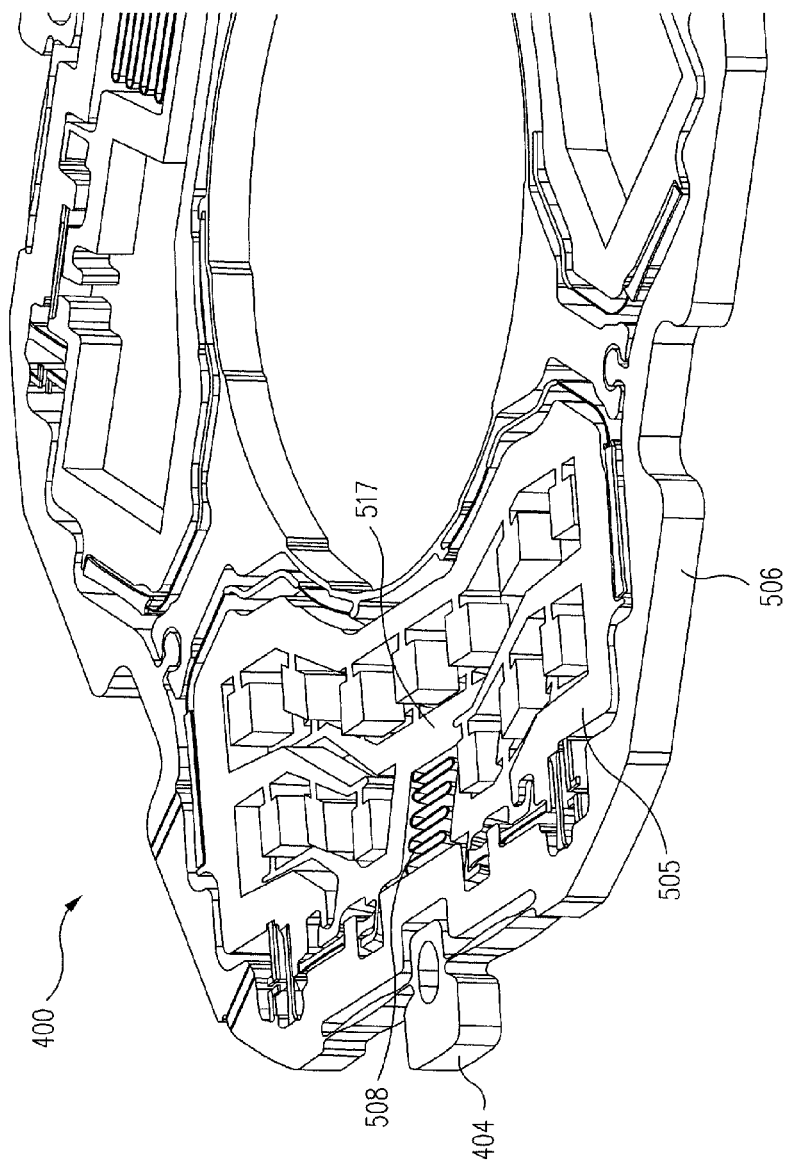
FIG. 9A illustrates a portion of the actuator device in a deployed configuration without any voltage applied thereto, in accordance with an embodiment.

FIG. 9A illustrates a portion of the actuator device 400 in a deployed configuration without any voltage applied thereto, in accordance with an embodiment. Without any voltage applied to the actuator device 400, the movable frame 505 is substantially in-plane with respect to the outer frame 506 and the deployed fixed frame 517 is substantially out-of-plane with respect to the outer frame 506 and the movable frame 505.

Figure 9B:
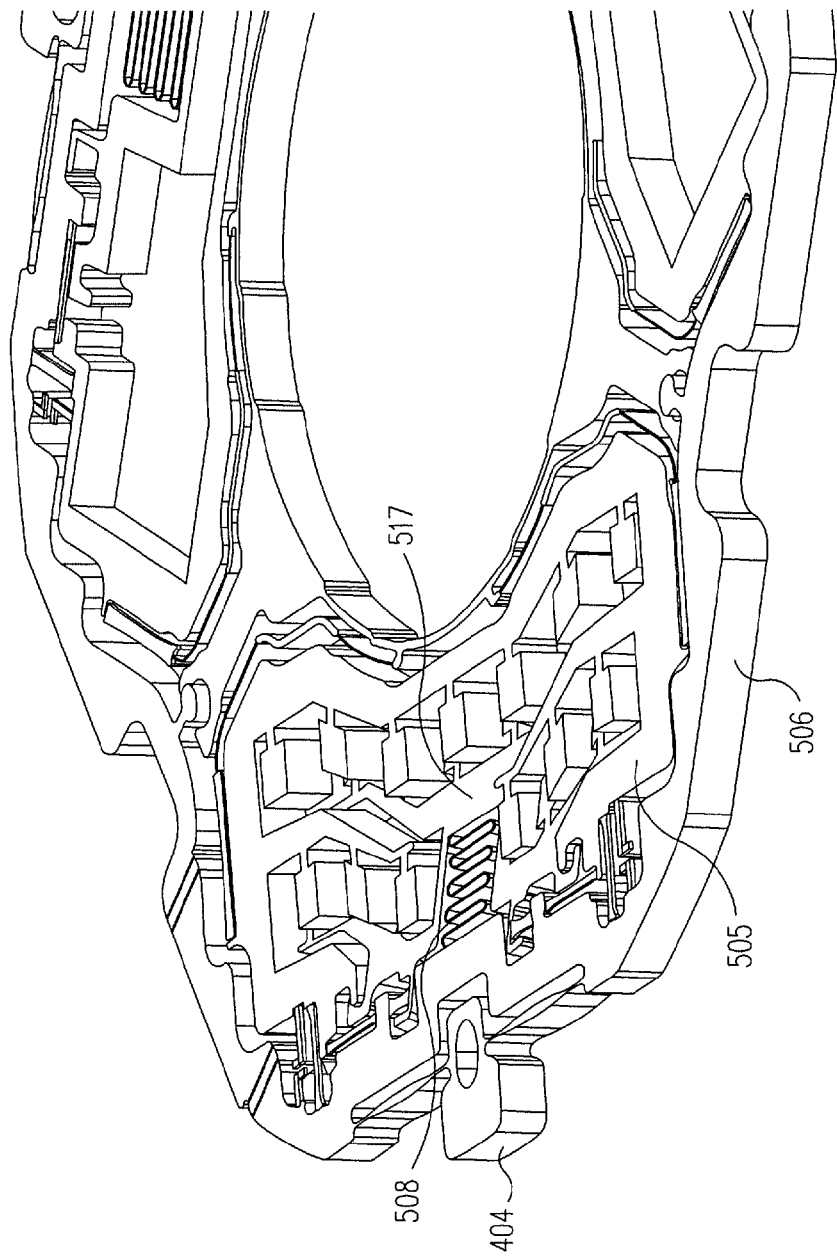
FIG. 9B illustrates a portion of the actuator device in a deployed configuration with a small voltage applied thereto, in accordance with an embodiment.

FIG. 9B illustrates a portion of the actuator device 400 in a deployed configuration with a small voltage applied thereto, in accordance with an embodiment. With the small voltage applied, the movable frame 505 has rotated toward the deployed fixed frame 517 and is in a partially actuated position.

Figure 9C:
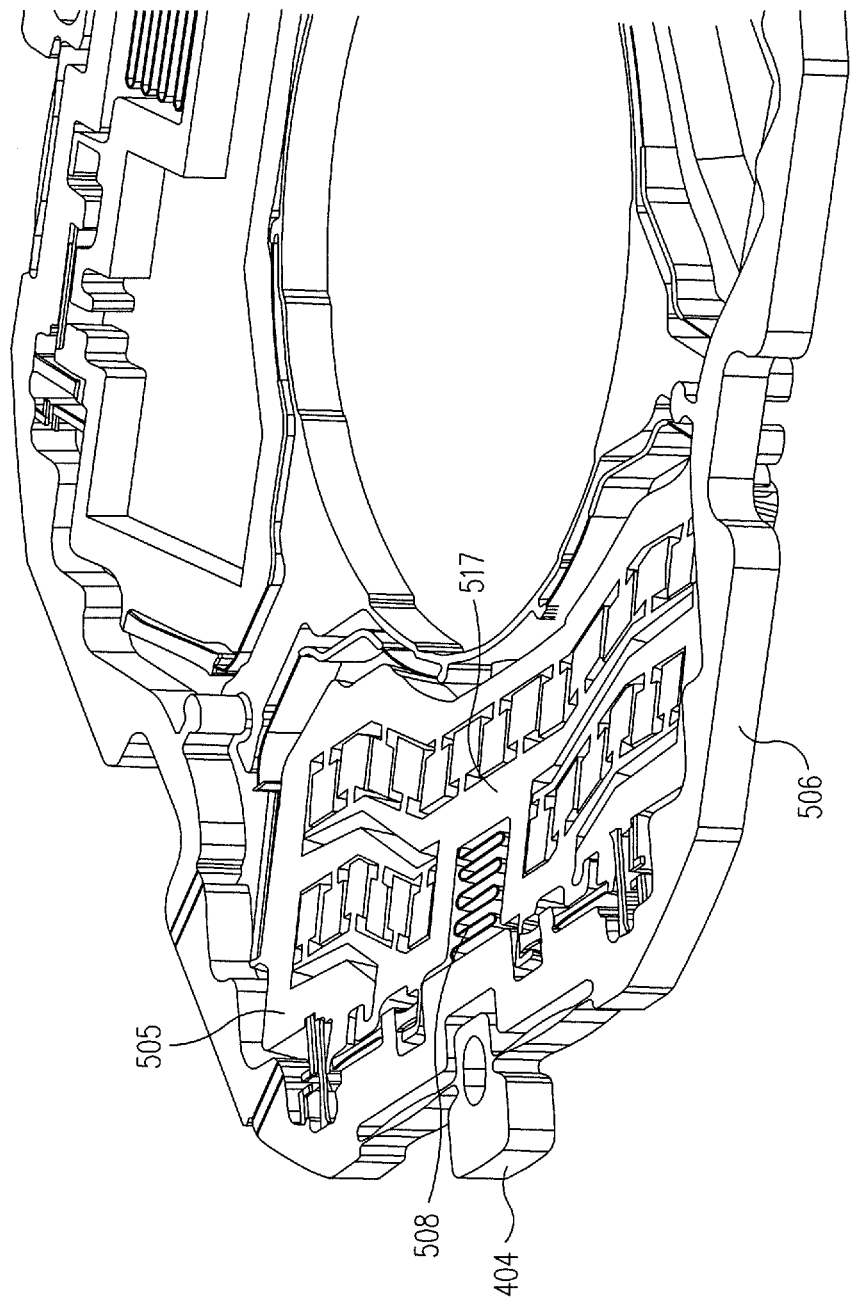
FIG. 9C illustrates a portion of the actuator device in a deployed configuration with a maximum voltage applied thereto, in accordance with an embodiment.

FIG. 9C illustrates a portion of the actuator device 400 in a deployed configuration with a maximum voltage applied thereto, in accordance with an embodiment. As may be seen, the movable frame 505 has rotated further toward the deployed fixed frame 517 and is in a fully actuated position.

FIG. 10 illustrates a top view of a lateral snubber assembly 1001, in accordance with an embodiment. The lateral snubber assembly 1001 may have a first snubber member 1002 and a second snubber member 1003. The first snubber member 1002 may be formed upon the fixed frame 517 and the second snubber member may be formed upon the movable frame 505. The first snubber member 1002 and the second snubber member 1003 may cooperate to inhibit undesirable lateral motion of the movable frame 505 with respect to the fixed frame 517 (and consequently with respect to the outer frame 506, as well) during shock or large accelerations. A gap "D" between the first snubber member 1002 and the second snubber member 1003 may approximately 2-3 micrometers wide to limit such undesirable lateral motion.

Figure 11:
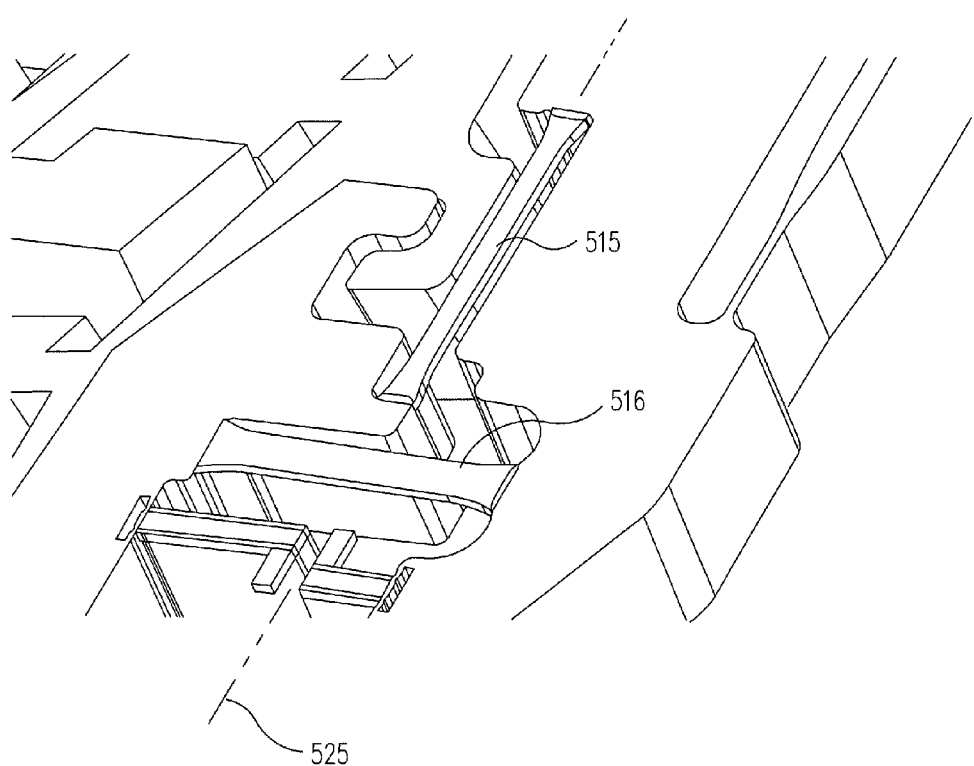
FIG. 11 illustrates a hinge flexure and a motion control torsional flexure, in accordance with an embodiment.

FIG. 11 illustrates a perspective view of the motion control torsional flexure 515 and the outer hinge flexure 516, in accordance with an embodiment. The motion control torsional flexure 515 and the outer hinge flexure 516 may be thinner than other portions of the actuator device 400 to provide the desired stiffness of the motion control torsional flexure 515 and the outer hinge flexure 516. For example, in one embodiment the outer hinge flexures 516, the inner hinge flexures 501, and the motion control torsional flexures 515 may have a width of approximately 100 microns and a thickness of approximately 2-3 microns.

The motion control torsional flexure 515 may be located on the pivot axis 525. In one embodiment, the pivot axis 525 is a line that connects the centers of the two outer hinge flexures 516. In one embodiment, the pivot axis 525 is the hinge line or axis about which the movable frame 506 rotates.

Figure 12:
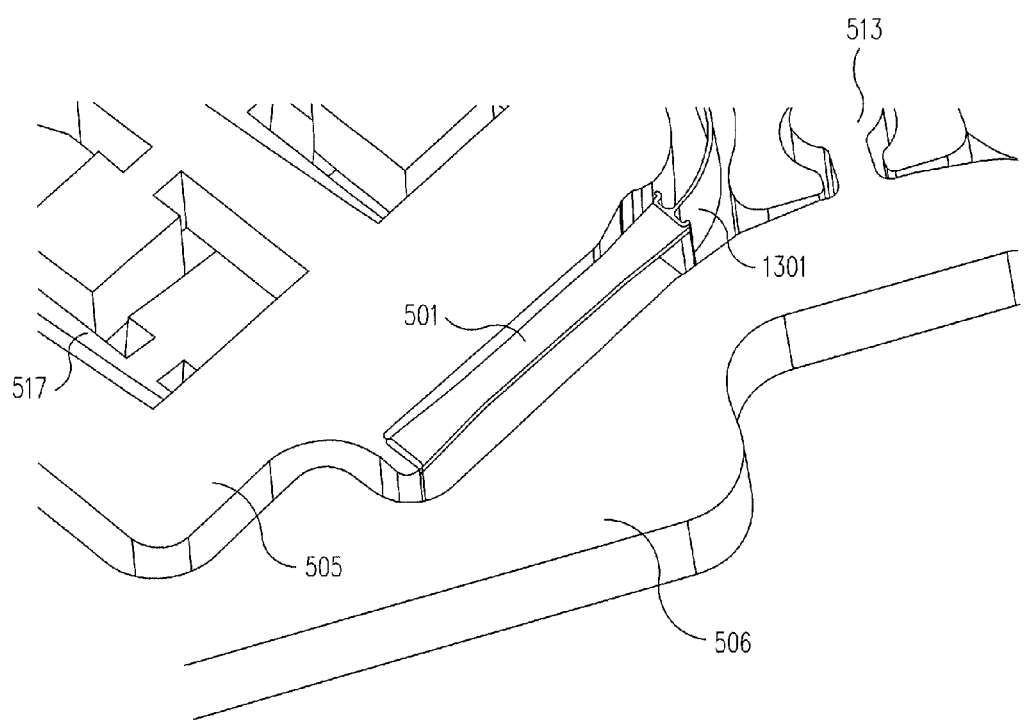
FIG. 12 illustrates an inner motion control hinge, in accordance with an embodiment.

FIG. 12 illustrates a perspective view of an inner hinge flexure 501, in accordance with an embodiment. The inner hinge flexure 501 may be thinner than other portions of the actuator device 400 to provide the desired stiffness of the inner hinge flexure 501. For example, in one embodiment, the inner hinge flexure 501 may be approximately 500 micrometers long, 60 micrometers wide, and 2-3 micrometers thick.

Figure 13:
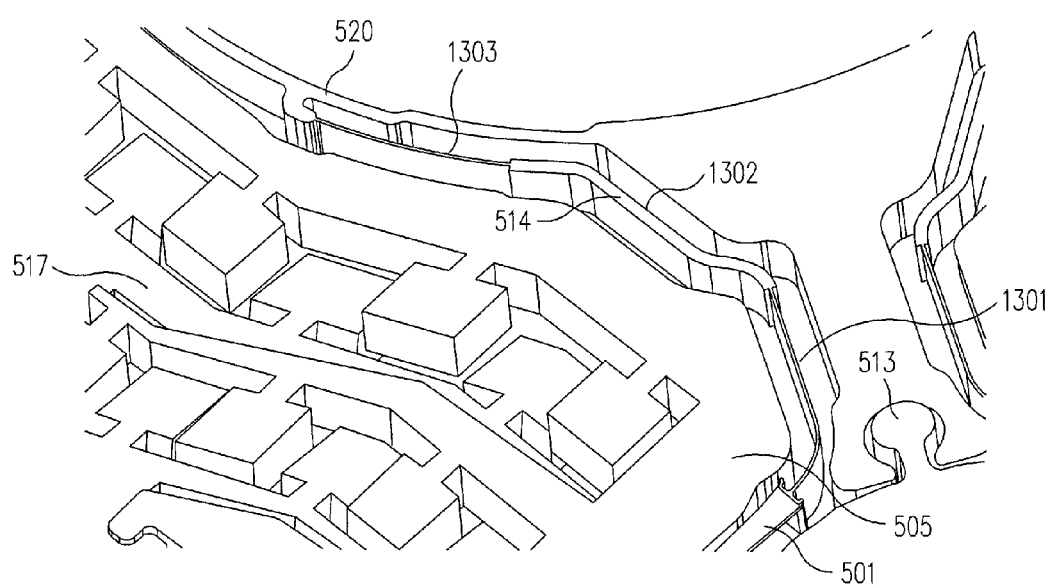
FIG. 13 illustrates a cantilever flexure, in accordance with an embodiment.

FIG. 13 illustrates a perspective view of a cantilever flexure 514 having the inner hinge flexure 501, a first thinned section 1301, a thicker section 1302, and a second thinned section 1303, in accordance with an embodiment. The cantilever flexure 514 may be used to transfer movement of the movable frames 505 to the platform 520. The cantilever flexure 514 may be used to facilitate the conversion of rotation of the movable frames 505 into translation of the platform 520.

The inner hinge flexure 501 may bend to permit the movable frame 505 to rotate while the platform 520 translates. The first thinned section 1301 and the second thinned section 1303 may bend to permit a change in distance between the movable frame 505 and the platform 520 as the movable fame 505 transfers movement to the platform 520.

The cantilever flexure 514 may be thinner proximate the ends thereof and may be thicker proximate the center thereof. Such configuration may determine a desired ratio of stiffnesses for the cantilever flexure 514. For example, it may be desirable to have a comparatively low stiffness radially to compensate for the change in distance between the movable frames 505 and the platform 520 as the movable frame 505 transfers movement to the platform 520.

Figure 14:
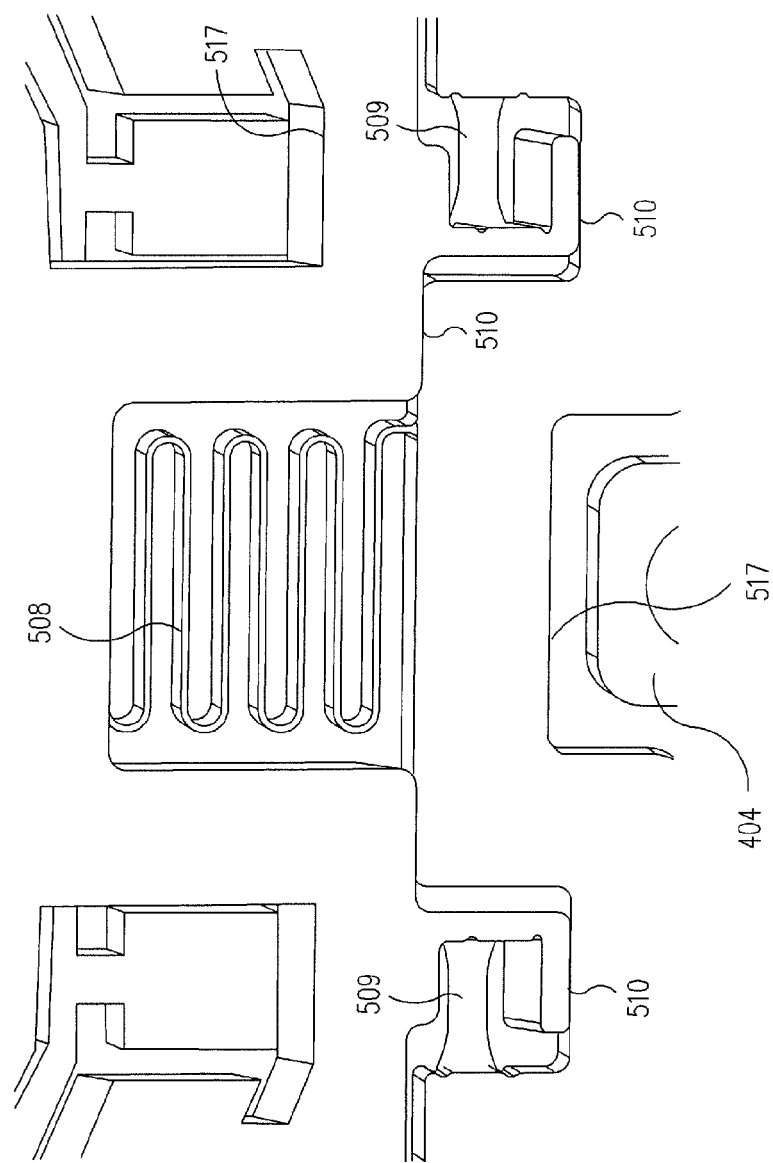
FIG. 14 illustrates a serpentine contact flexure and a deployment torsional flexure, in accordance with an embodiment.

FIG. 14 illustrates a perspective view of the serpentine contact flexure 508 and the deployment torsional flexure 509, in accordance with an embodiment. The serpentine contact flexure 508 may facilitate electrical contact between the electrical contacts 404 and the deployed fixed frame. The deployment torsional flexures 509 may facilitate rotation of the deployed fixed frame 517 with respect to the outer frame 506 during deployment.

Figure 15:
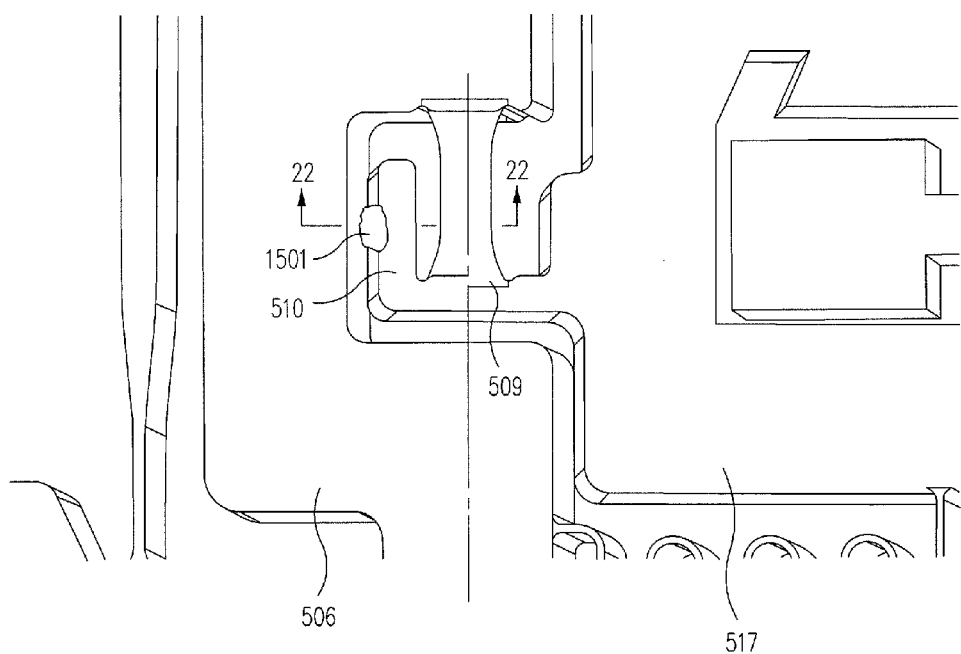
FIG. 15 illustrates a top view of a deployment stop, in accordance with an embodiment.

FIG. 15 illustrates a perspective top view of a deployment stop 510 showing that it does not contact an outer frame 506 on the top side when deployed, in accordance with an embodiment. An epoxy 1501 may be applied to the top surfaces of the deployment stop 510 and the outer frame 506 to fix the deployment stop 510 into position with respect to the outer frame 506. Thus, the epoxy 1501 may fix the deployed fixed frame 517 into position with respect to the outer frame 506. Various portions of the deployed fixed frame 517 may function as the deployment stops 517. For example, other portions of the deployed fixed frame 517 that abut the outer frame 506 when the deployed fixed frame is deployed may function as the deployment stops 510.

Figure 16:
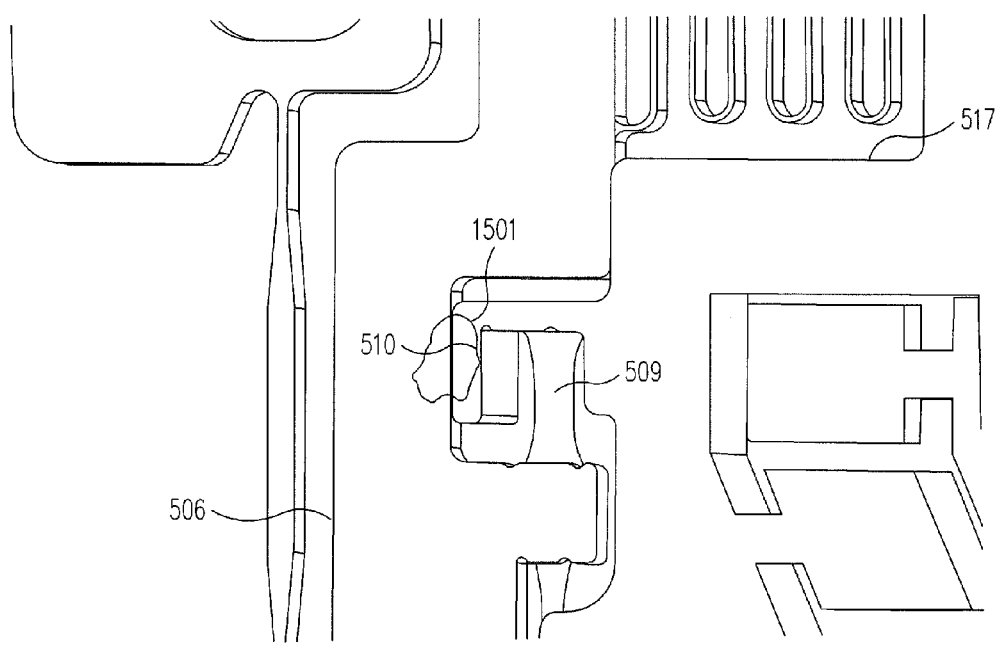
FIG. 16 illustrates a bottom view of the deployment stop, in accordance with an embodiment.

FIG. 16 illustrates a perspective bottom view of the deployment stop 510 showing that it contacts the outer frame 506 on the bottom side when deployed, in accordance with an embodiment. The epoxy 1501 may be applied to the bottom surfaces of the deployment stop 510 and the outer frame 506 to fix the deployment stop 510 into position with respect to the outer frame 506. The epoxy 1501 may be applied to both the top surfaces and the bottom surfaces of the deployment stop 510 and the outer frame 506, if desired.

Figure 17A:
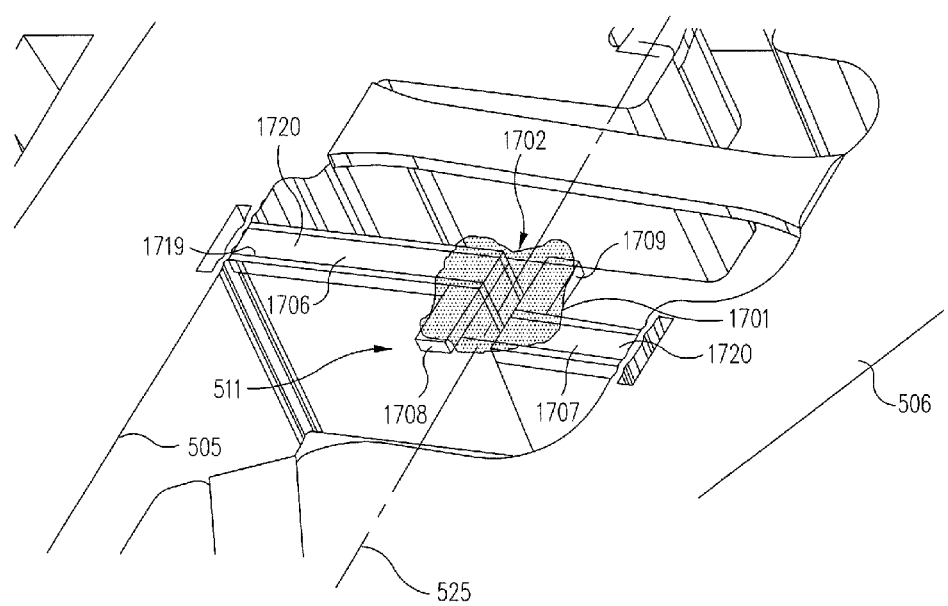
FIG. 17A illustrates a flap damper, in accordance with an embodiment.

FIG. 17A illustrates a perspective view of a flap damper 511, in accordance with an embodiment. The flap damper 511 is located where the desirable relative motion during intended operation, (e.g., actuation) of actuators 550, is comparatively low and where the potential undesirable relative motion during shock is comparatively high. For example, the flap damper 511 may be formed on the pivot axis 525.

A damping material 1701 may extend across a gap 1702 formed between the outer frame 506 and the movable frame 505. The damping material 1701 may have a high damping coefficient. For example, in one embodiment, the damping material 1701 may have a damping coefficient of between 0.7 and 0.9. For example, the damping material 1701 may have a damping coefficient of approximately 0.8. In one embodiment, the damping material 1701 may be an epoxy.

The damping material 1701 may readily permit the desired motion of the movable frame 505 relative to the outer frame 506. The damping material 1701 may inhibit undesired motion of the movable frame 505 relative to the outer frame 506 due to a shock. Thus, the damping material 1701 may permit rotation of the movable frame 505 relative to the outer frame 506 during actuation of the actuators 550 and may inhibit lateral motion and/or out of plane motion of the movable frame 505 relative to the outer frame 506 during a shock.

The flap damper 511 may have a flap 1706 that extends from the movable frame 505 and may have a flap 1707 that extends from the outer frame 506. A gap 1702 may be formed between the flap 1706 and the flap 1707.

An extension 1708 may extend from the flap 1706 and/or an extension 1709 may extend from the flap 1707. The extension 1708 and the extension 1709 may extend the length of the gap 1702 such that more damping material 1701 may be used than would be possible without the extension 1708 and/or the extension 1709.

Trenches 1719 may be formed in flaps 1706 and/or 1707 and a trench material 1720 that is different from the material of the flaps 1706 and 1707 may be deposited within the trenches 1719. For example, the flaps 1706 and 1707 may be formed of single crystalline silicon and the trench material 1720 may be formed of polycrystalline silicon. Any desired combination of materials may be used for the flaps 1706 and 1707 and for the trench material 1720, so as to achieve the desired stiffness of the flaps 1706 and 1707.

Figure 17B:
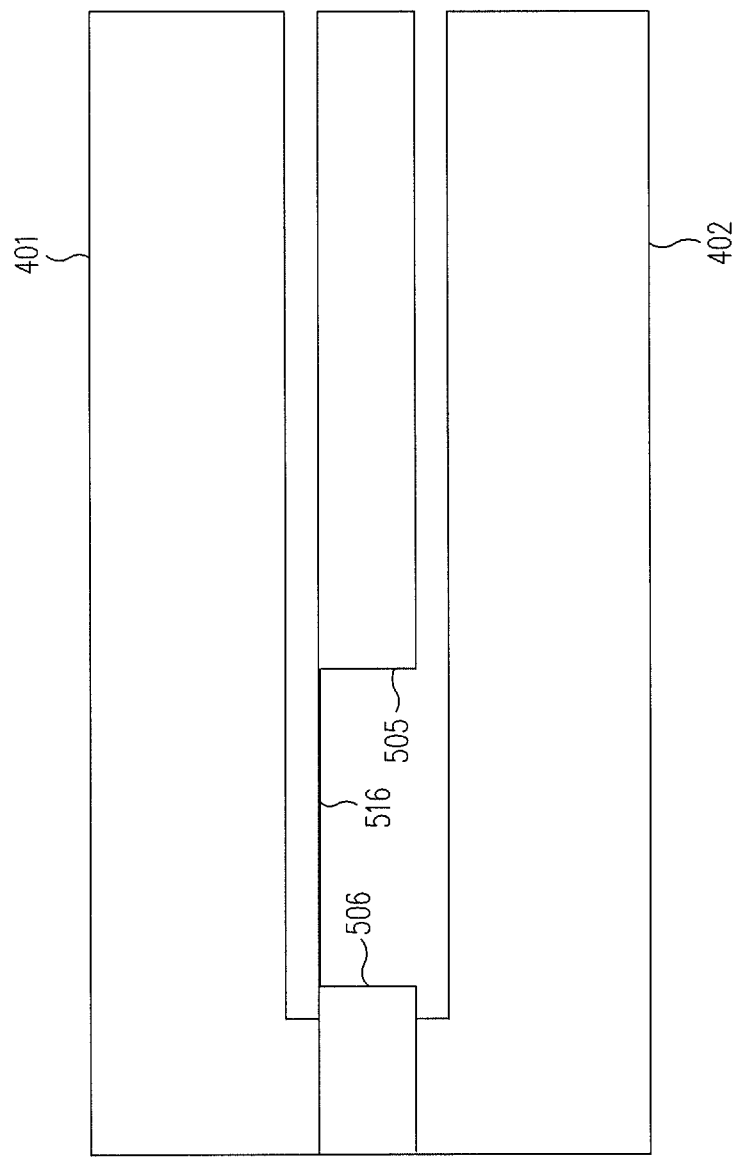
FIG. 17B illustrates a movable frame disposed between an upper module cover and a lower module cover with no shock applied, in accordance with an embodiment.

FIG. 17B illustrates the movable frame 505 disposed between the upper module cover 401 and the lower module cover 402 without a shock being applied thereto. In the absence of a shock, the movable frame 505 remains in its unactuated position and the outer hinge flexure 516 is unbent.

Figure 17C:
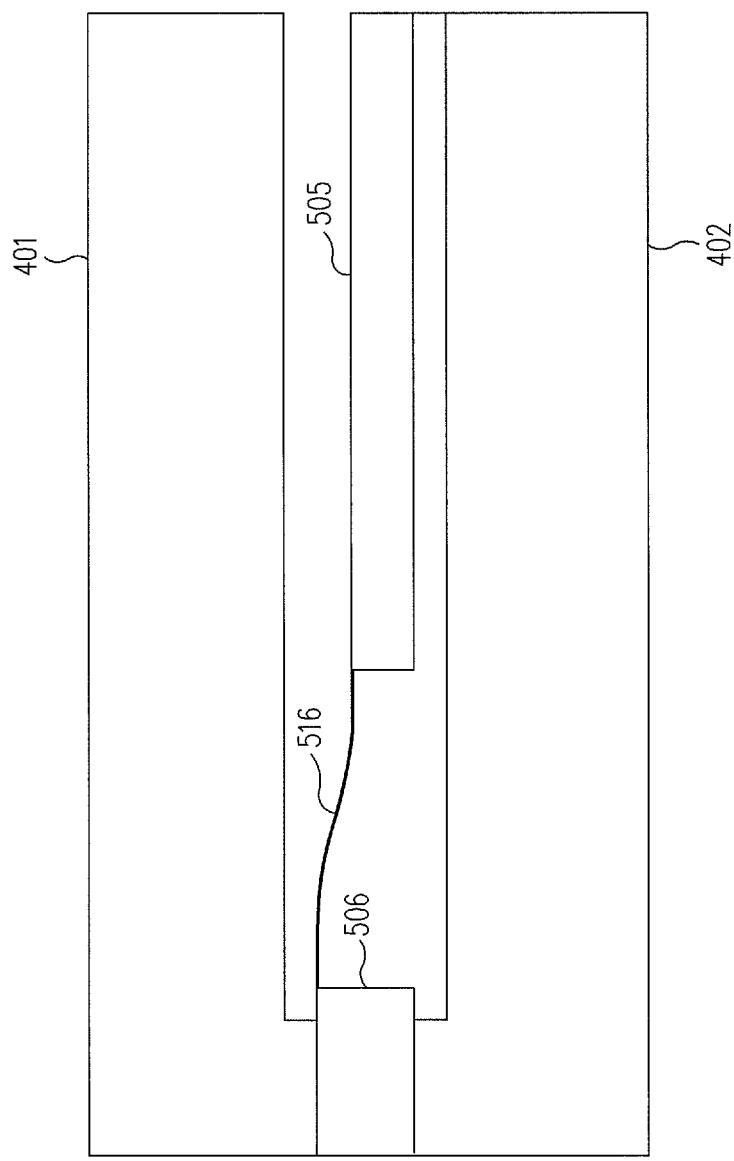
FIG. 17C illustrates the movable frame disposed between the upper module cover and the lower module cover with a shock applied, in accordance with an embodiment.

FIG. 17C illustrates the movable frame 505 after it has been moved to a position against the lower module cover 402 by a shock, such as may be caused by dropping the electronic device 100. Movement of the movable frame 505 may be limited or snubbed by the lower module housing 402 and undesirable double bending of the outer hinge flexure 516 may be limited thereby. In a similar fashion, the upper module housing 401 may limit movement of the movable frame 505 and double bending of the outer hinge flexure 516. Thus, undesirable stress within the outer hinge flexures 516 may be mitigated.

FIGS. 17D-17H illustrate an alternative embodiment of an outer hinge flexure 1752. As illustrated in these figures, in some embodiments, the outer hinge flexures 1752 may be X-shaped for increased control of the motion of the moveable frame 505 in the lateral direction. The outer hinge flexures 516, 1752 may generally tend to bend, such as about a central portion thereof, to facilitate movement of the moveable frame 505 with respect to the outer frame 506. Other shapes are contemplated. For example, the outer hinge flexure 1752 can be shaped like a H, I, M, N, V, W, Y, or may have any other desired shape. Each outer hinge flexure 1752 can comprise any desired number of structures that interconnect the outer frame 506 and the movable frame 505. The structures may be interconnected or may not be interconnected. The structures may be substantially identical with respect to one another or may be substantially different with respect to one another. Each outer hinge flexure 1752 may be substantially identical with respect to each other hinge flexure 1752 or may be substantially different with respect thereto.

The outer hinge flexures 516, 1752 and any other structures may be formed by etching as discussed herein. The outer hinge flexure and any outer structures may comprise single crystalline silicon, polycrystalline silicon, or any combination thereof.

FIGS. 17D-F and 17I-17N show an alternative embodiment of the lateral snubber assembly 1754, another embodiment of which is discussed above in connection with FIG. 10 herein. The lateral snubber assembly 1754 of FIGS. 17D-F and 17I-17N generally has more rounded curves with respect to the lateral snubber assembly 1001 of FIG. 10.

Figure 17D:
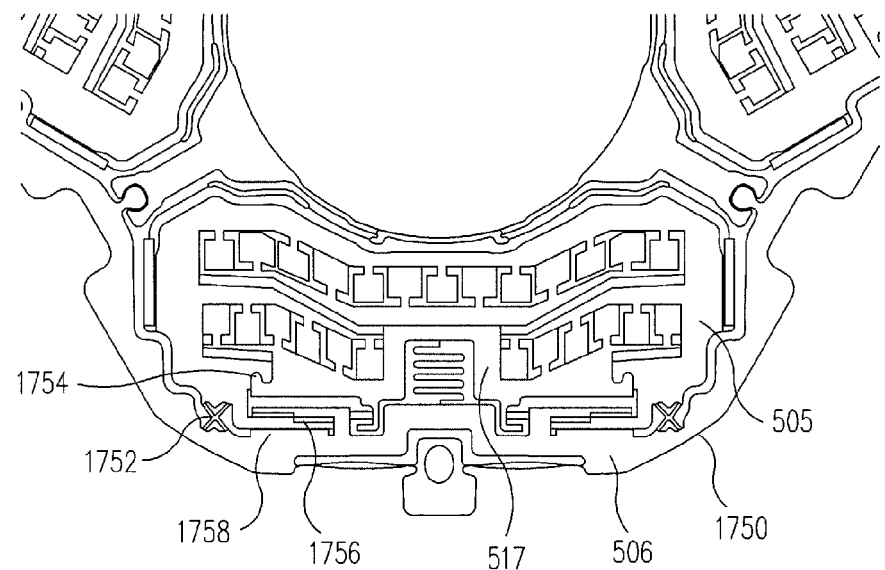
FIG. 17D illustrates a partial top view of another actuator device, in accordance with an embodiment.
Figure 17E:
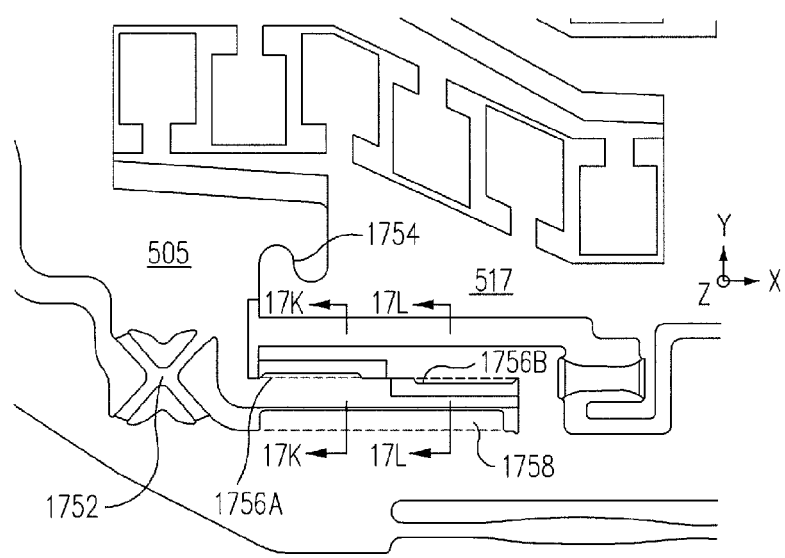
FIG. 17E illustrates an enlarged top view of the actuator device, in accordance with an embodiment.
Figure 17F:
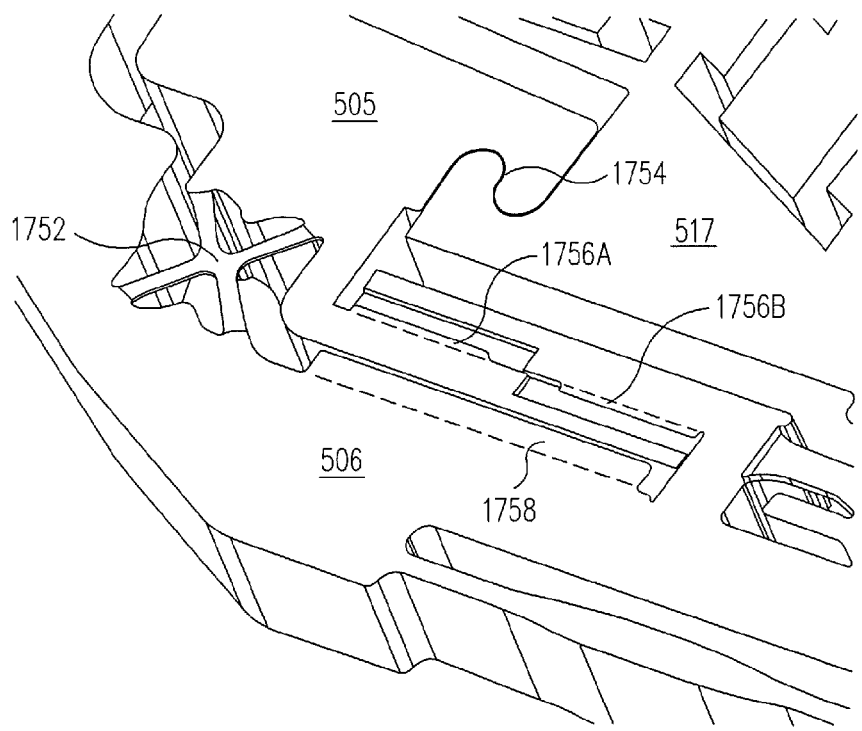
FIG. 17F illustrates an outer hinge flexure, a lateral snubber assembly, a single snubber flap and an interlocking snubber flaps feature of the actuator device, in accordance with an embodiment.
Figure 17G:
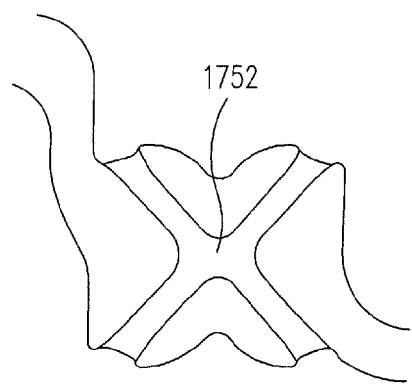
FIGS. 17G and 17H illustrate the outer hinge flexure, in accordance with an embodiment.
Figure 17H:
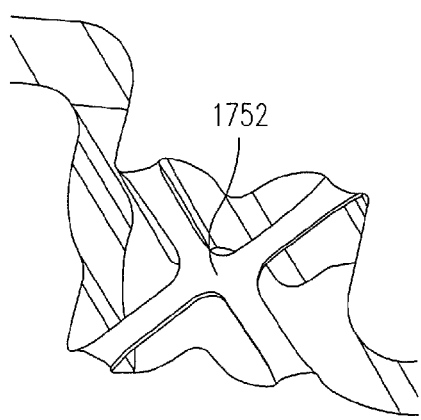
Figure 17I:
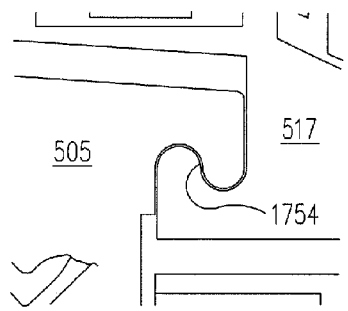
FIGS. 17I and 17J illustrate the lateral snubber assembly, in accordance with an embodiment.
Figure 17J:
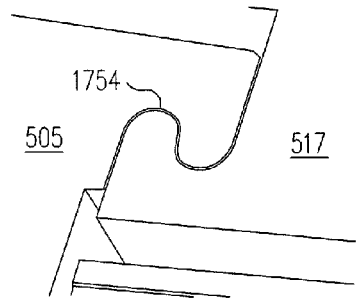

FIGS. 17D-17F illustrate an example embodiment of an interlocking snubber flaps feature 1756 useful for constraining both vertical movement of a component, e.g., moveable component 505, in the ±Z directions, as well as lateral movement thereof, i.e., in the ±X and/or ±Y directions.

As illustrated in FIG. 17F, this interlocking flaps feature includes the formation of a pair of flaps 1756A and 1756B respectively extending from moveable and fixed components 505 and 506 and over a corresponding shoulder 1762 formed on the other, opposing component. The flap 1756A on the moveable component 505 limits motion of the moveable component 505 in the −Z direction, and the flap 1756B on the fixed component 506 limits motion of the moveable component 505 in the +Z direction. Additionally, as illustrated in FIGS. 17K, 17L and 17N, the gap 1760 between the two components 505 and 506, which may be formed as discussed above in connection with FIGS. 49A-49F, may limit motion of the moveable component 505 in the ±X and/or ±Y directions.

Figure 17K:
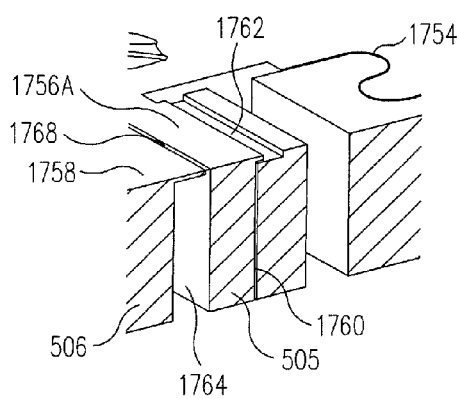
FIGS. 17K and 17L illustrate cross-sectional views of the single snubber flap and the interlocking snubber flaps, in accordance with an embodiment.
Figure 17L:
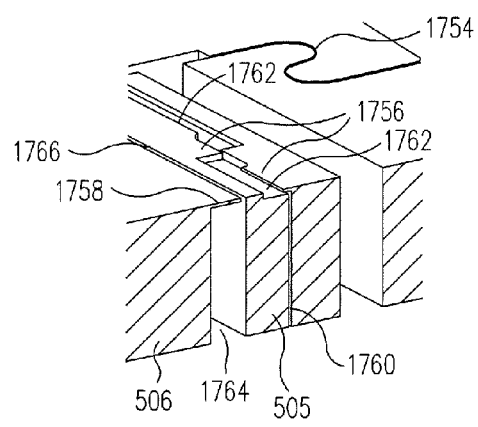
Figure 17M:
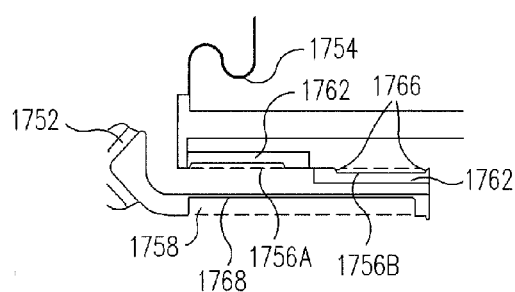
FIG. 17M illustrates a top view of the lateral snubber assembly, the single snubber flap and the interlocking snubber flaps, in accordance with an embodiment.

As illustrated in FIG. 17M, the respective front ends of the flaps 1756A and 1756B may define corners at the opposite ends thereof, and one or more of the corners may incorporate elliptical fillets 1766.

Figure 17N:
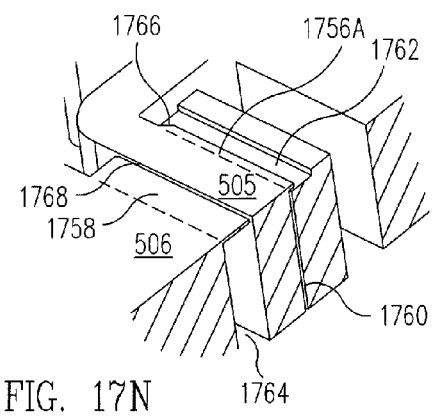
FIG. 17N illustrates cross-sectional views of the single snubber flap and the interlocking snubber flaps, in accordance with an embodiment.

As illustrated in FIGS. 17D-17L and FIGS. 17K-17N, a single snubber flap 1758 may be provided for constraining lateral movement of a component, e.g., moveable component 505, in an actuator device 1750. For example, the snubber flap 1758, which in some embodiments may comprise polysilicon, may extend from a fixed component, e.g., component 506, and toward but not over, the moveable component 505 to limit motion of the moveable component 505 in the lateral, i.e., in the in the ±X and/or ±Y directions. As illustrated in FIGS. 17K, 17L and 17N, the gap 1764 between the fixed and moveable components 505 and 506 can be made relatively larger than the gap 1768 between the snubber flap 1758 and the moveable component 505, such that the snubber flap 1758 does not interfere with normal rotational motion of the movable component 505, but does function to prevent unwanted lateral motion thereof.

Figure 18:
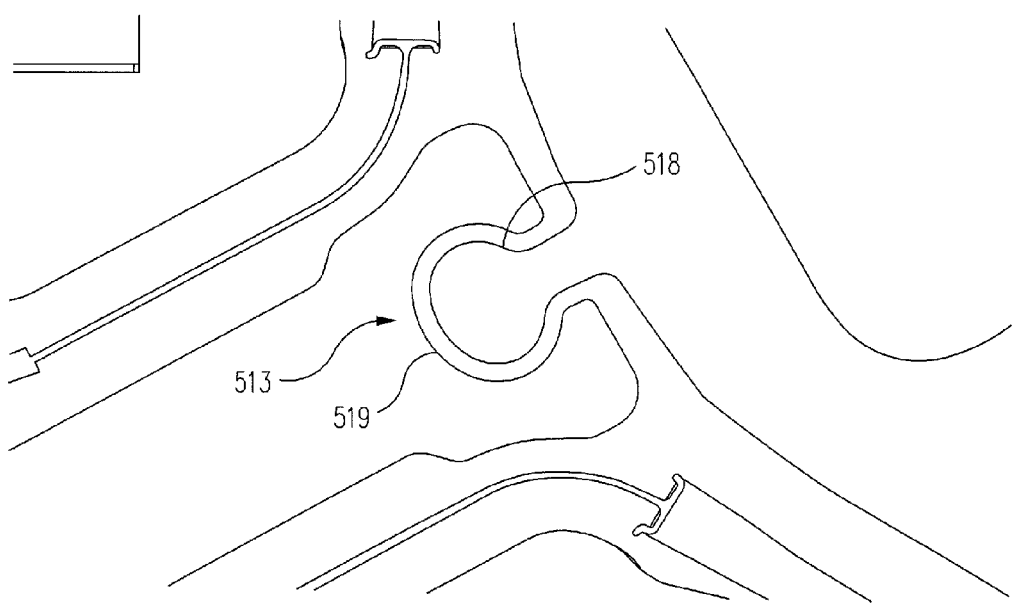
FIG. 18 illustrates a ball-in-socket snubber, in accordance with an embodiment.

FIG. 18 illustrates a ball-in-socket snubber 513, in accordance with an embodiment. The ball-in-socket snubber 513 may have a substantially cylindrical ball 518 that is slidably disposed within a substantially complementary cylindrical socket 519. The ball-in-socket snubber 513 permit desired movement of the platform 520 with respect to the outer frame 506 and limit other movement.

Figure 19:
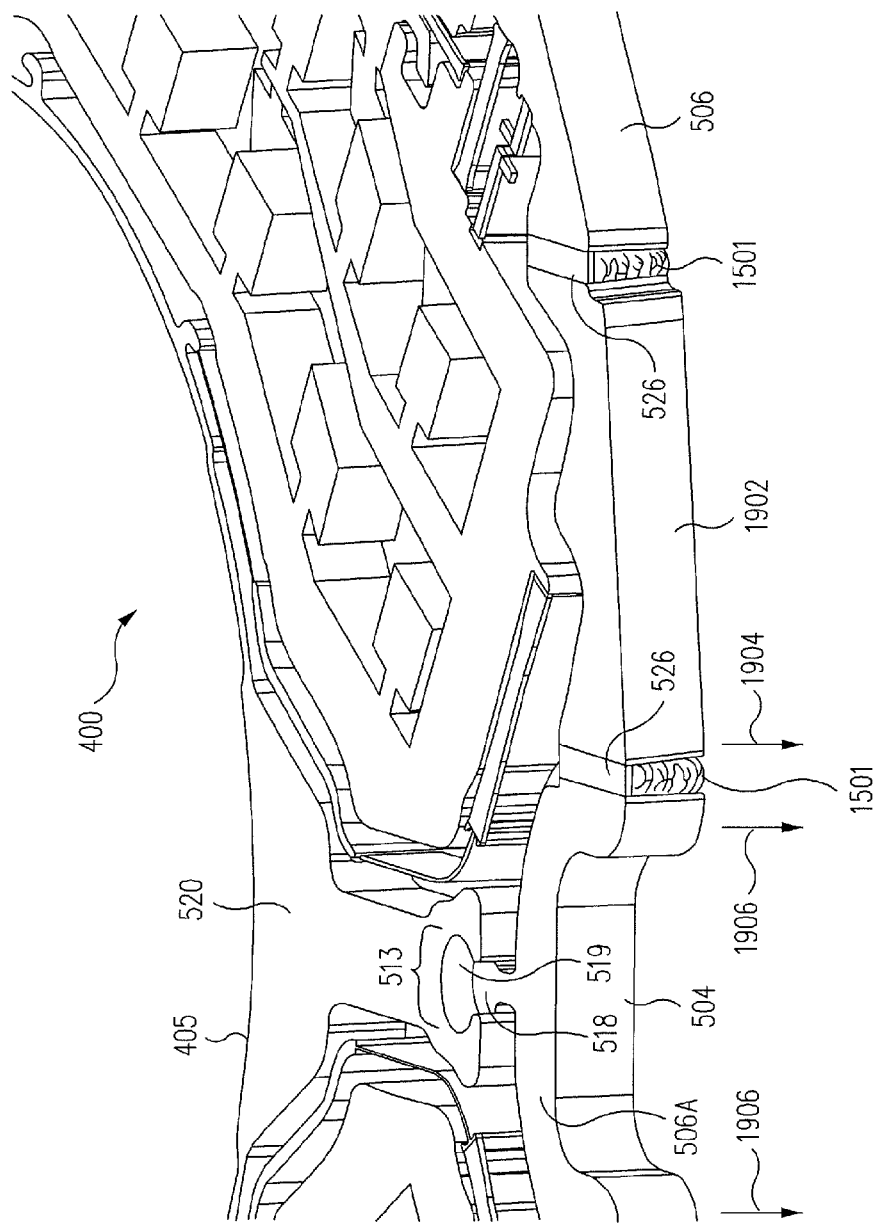
FIG. 19 illustrates the ball-in-socket snubber and two frame hinges, in accordance with an embodiment.

FIG. 19 illustrates a perspective view of the ball-in-socket 513 and two frame hinges 526, in accordance with an embodiment. The frame hinges 526 may be hinge flexures in the otherwise substantially rigid outer frame 506. The frame hinges 526 permit the outer frame 506 to deform out-of-plane while maintaining a desired in-plane rigidity.

FIG. 3B is an exploded perspective view of a first example embodiment of a lens barrel 200 having an actuator device 400 disposed therein in accordance with an embodiment of the present invention. As illustrated in FIG. 3B, a lens barrel assembly 201 comprises an annular lens barrel 200 having a central axis corresponding to an optical axis 410.

A plurality of first optical elements, viz., the stationary lenses 302, is disposed in the lens barrel 200 such that the respective optical axes of the stationary lenses 302 are aligned coaxially with each other and the optical axis 410 of the lens barrel 200. An actuator device 400 of the type discussed above in connection with FIG. 5A is disposed in the lens barrel 200 in front of the stationary lenses 302. The actuator device 400 includes actuators 550 (e.g., rotationally acting actuators in one embodiment), a moving platform 520 coupled to each of the actuators 550 by a cantilever flexure (e.g., a flexible hinge) 514, and a central opening 405 in the moving platform 520 that is concentric to a central axis of the device 400. The actuator device 400 is mounted concentrically in the lens barrel 200 in front of the stationary lenses 302 in the manner described in more detail below such that the central axis of the device 400 is aligned coaxially with the optical axis 410 of the lens barrel 200 and the optical axes of the stationary lenses 302.

A front cover, which may be substantially similar to the front cover 401 of the actuator module 300, is attached to a front surface of the actuator device 400, e.g., by adhesive bonding, such that a central opening 304 in the front cover 401 is disposed concentric with the central opening 405 in the moving platform 520. The moveable lens 301 is mounted in the central opening 405 of the moving platform 520 such that an optical axis of the movable lens 101 is aligned coaxially with the central axis 410 of the lens barrel 200, the optical axes of the stationary lenses 302 and the central axis of the actuator device 400, and such that rotational movement of the actuators 550 causes the moving platform 520 and movable lens 101 to move conjointly with a purely translation movement along the optical axis of the movable lens 101, and hence, substantially coaxially along the optical axis 410 of the lens barrel 200.

Figure 20:
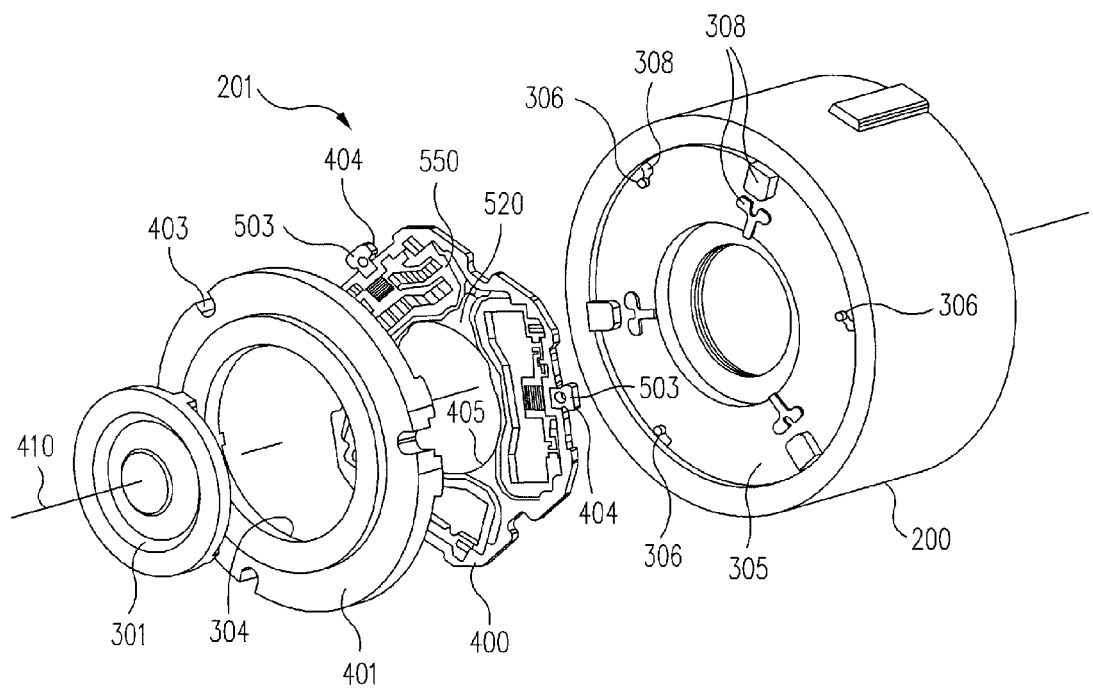
FIG. 20 is another exploded perspective view of the first example lens barrel of FIG. 3B, partially assembled, showing a plurality of first optical elements fully disposed within an annular barrel thereof, in accordance with an embodiment.
Figure 21:
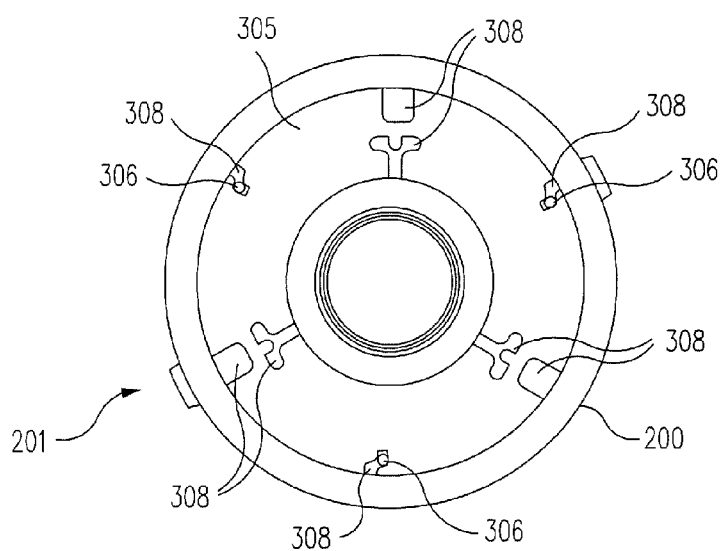
FIG. 21 is a front end elevation view of the partially assembled first lens barrel, with the actuator device and a second optical element omitted to show mounting and alignment features on a front surface of a first optical element immediately adjacent to the actuator device, in accordance with an embodiment.

FIG. 20 is another exploded perspective view of the first lens barrel 200 of FIG. 3B, partially assembled, in which the stationary lenses 302 are shown fully disposed within the lens barrel 200, and FIG. 21 is a front end elevation view of the partially assembled first lens barrel 200, with the actuator device 400, front cover 401 and moveable lens 101 omitted to show raised actuator device mounting features 308 and forwardly protruding alignment pins 306 disposed on a front surface 305 of a stationary lens 302 immediately adjacent to the actuator device 400.

As illustrated in FIGS. 20 and 21, the first stationary lens 302 immediately adjacent to the actuator device 400 includes a plurality of forwardly protruding alignment pins 306, together with a plurality of raised platform-like mounting features 308, both disposed symmetrically around an outer margin of a front surface 305 thereof. Some of the raised platform mounting features 308 correspond to areas on the actuator device 400 at which an adhesive may be placed in order to bond the device 400 to the front surface 305 of the immediately adjacent stationary lens 302, and the front cover 401 may also be provided with similar raised mounting features 308 to enable its attachment, e.g., with an adhesive, to the front surface of the actuator device 400 and/or a corresponding raised mounting feature 308 on the front surface of the first stationary lens 302 or rear cover 402 of an actuator module 300.

In some embodiments, the raised mounting features 308 may comprise two different types of features. For example, the raised features 308 located at the outer margin of the actuator device 400 may comprise through-connect features used to bond the front cover 401 to the first stationary lens 302 or rear cover 402 of an actuator module 300. The actuator device 400 may be adhesively attached to the front cover 401 and the stationary lens 302 or the rear cover 402 of an actuator module 402 only in areas immediately adjacent to the alignment pins 306. An inner, T-shaped set of the raised features 308 may be used as stops to pre-load the moving portion of the platform 520 of the actuator device 400 to, e.g., a focus-at-infinity position. As illustrated in FIG. 3B, the device 400 further includes electrical contacts 404 (also referred to as radial alignment and mounting tabs 404) disposed symmetrically around an outer periphery thereof, each tab 404 having an outer circumferential surface 503 and an alignment aperture 310 disposed therein.

Figure 22:
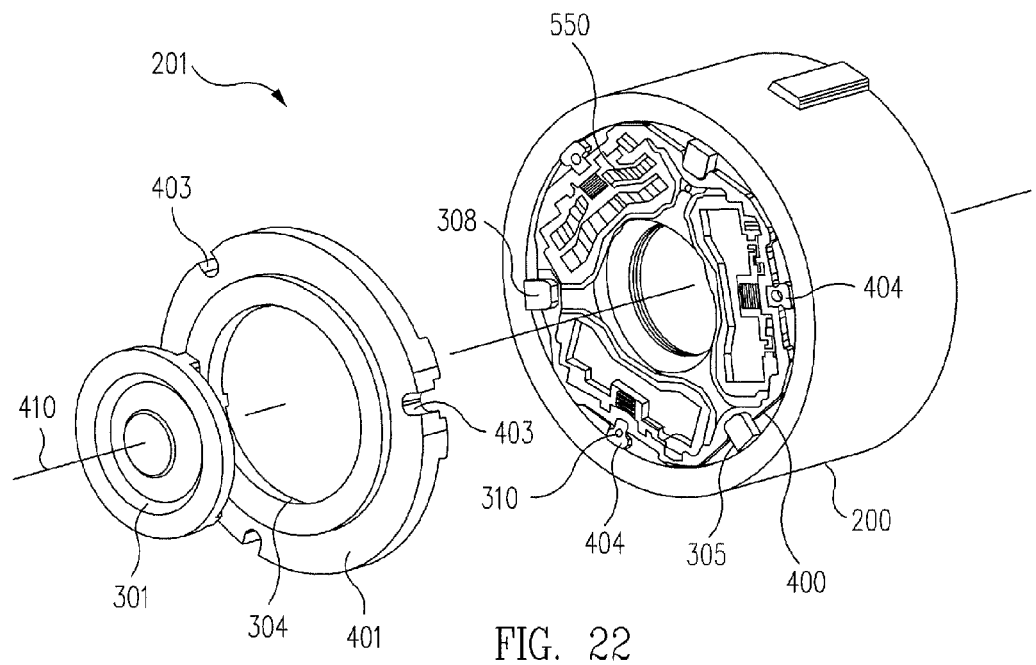
FIG. 22 is another exploded perspective view of the partially assembled first lens barrel, showing the actuator device fully disposed within the barrel, in accordance with an embodiment.
Figure 23:
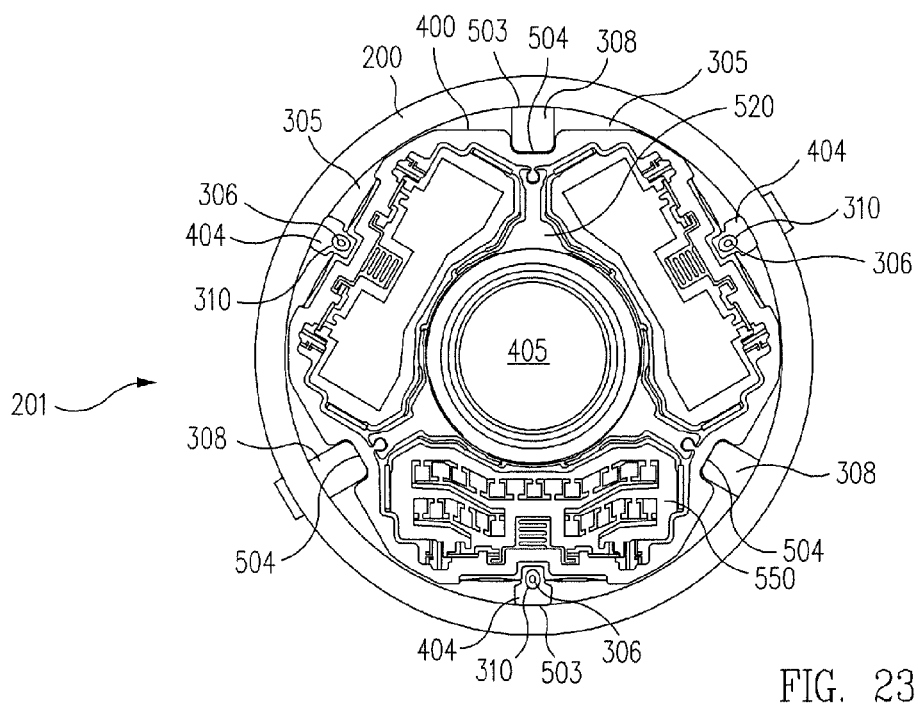
FIG. 23 is a front end elevation view of the partially assembled first lens barrel, with the first optical element and a front cover omitted to show the actuator device mounted in the barrel, in accordance with an embodiment.

FIG. 22 is another exploded perspective view of the partially assembled first lens barrel 200, showing the actuator device 400 fully disposed within the lens barrel 200, and FIG. 23 is a front end elevation view of the partially assembled first lens barrel 200, with the movable lens 101 and front cover 401 omitted to show the actuator device 400 mounted concentrically in the lens barrel 200. As illustrated in FIGS. 22 and 23, the actuator device 400 is attached to the raised actuator device mounting features 308 disposed on the adjacent first optical element 305, e.g., by adhesive bonding, such that each of the alignment pins 306 engages within a corresponding one of the alignment apertures 310 in the tabs 404, and a tab-shaped one of the raised mounting features 308 is disposed in a respective one of the recesses 504 of the actuator device 400 so as to align the actuator device 400 concentrically and rotationally with respect to the immediately adjacent stationary lens 302 (see FIGS. 20 and 21), and such that the outer circumferential surfaces 503 of the tabs 404 respectively abut the inner surface of the lens barrel 200 and thereby align the actuator device 400 concentrically within the lens barrel 200.

FIGS. 24 and 25 are other exploded perspective views of the partially assembled first lens barrel 200, and FIG. 26 is a front end elevation view of the first lens barrel 200, fully assembled. As illustrated in FIGS. 24-26, in one embodiment, the front cover 401 may include a plurality of radial slots (e.g., cutouts) 403 disposed symmetrically around its outer periphery, each slot 403 exposing a front surface of a respective one of the tabs 404. In embodiments in which the actuator device 400 is made of an electrically conductive material, e.g., a semiconductor material, such as silicon, the tabs 404, including the front surfaces thereof, will also be electrically conductive. Alternatively, the front surface of at least one of the tabs 404 may be made electrically conductive by plating it with an electrically conductive material, such as gold, monocrystalline silicon or polycrystalline silicon.

In either case, as illustrated in FIG. 26, the electrically conductive front surfaces of the tabs 404 exposed by the slots 403 provide a convenient way for conveying external ground and power signals to the actuators 550 of the actuator device 400. For example, in the example embodiment illustrated in FIG. 26, a wire or a flexible circuit board 312 carrying, for example, an electrical ground or power signal, can be electrically connected to the conductive front surface of a tab 404 by way of, e.g., a bolus 314 of an electrically conductive adhesive disposed within the corresponding radial slot 403 and upon the conductive surface.

As discussed above, any one of the movable and stationary lenses 301, 302 in the first lens barrel 200 may comprise, instead of lenses, other optical elements, such as a group of lenses, including compound lenses, apertures (variable or fixed), shutters, mirrors (which may be flat, non-flat, powered, or non-powered), prisms, spatial light modulators, diffraction gratings, lasers, LEDs, detectors and the like. The type and arrangement of these optical elements 301, 302 may be as described in, for example, any of the following: U.S. Pat. No. 7,663,817, issued Feb. 16, 2010; U.S. Patent Application Publication No. 2008/0044172, published Feb. 21, 2008; U.S. patent application Ser. No. 11/550,305, filed Oct. 17, 2006; and U.S. patent application Ser. No. 11/505,660, filed Aug. 16, 2006, all of which are incorporated herein by reference in their entirety.

With reference to FIG. 3B, in one embodiment, one or more of the moveable and stationary lenses 301, 302, e.g., the movable lens 301, may be mounted concentrically within an annular lens holder, and at least one of the lenses 301 or 302, the lens holder, the annular lens barrel 200 and the front cover 401 may comprise a plastic material, for example, a thermoforming or a thermosetting plastic, for cost reduction and shock resistance.

Figure 27:
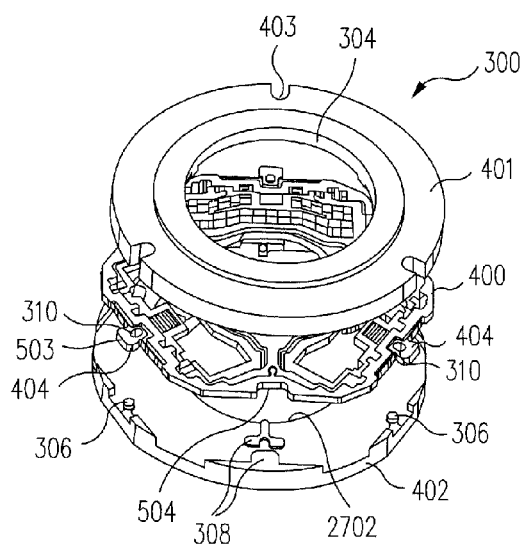
FIG. 27 is an exploded perspective view of the actuator module of FIG. 4, in accordance with an embodiment.
Figure 28:
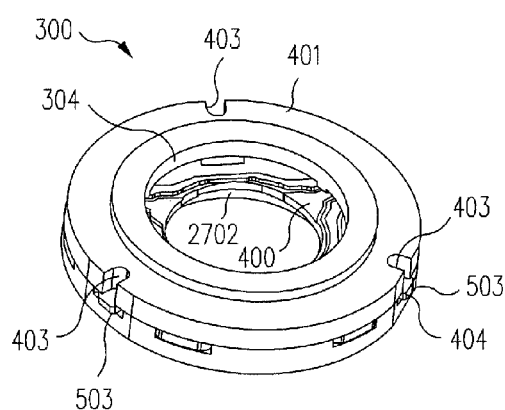
FIG. 28 is a perspective view of the actuator module, partially assembled, in accordance with an embodiment.
Figure 29:
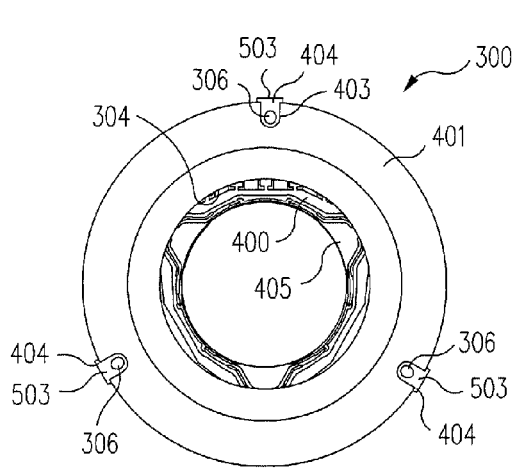
FIG. 29 is a front end elevation view of the partially assembled actuator module, in accordance with an embodiment.
Figure 30:
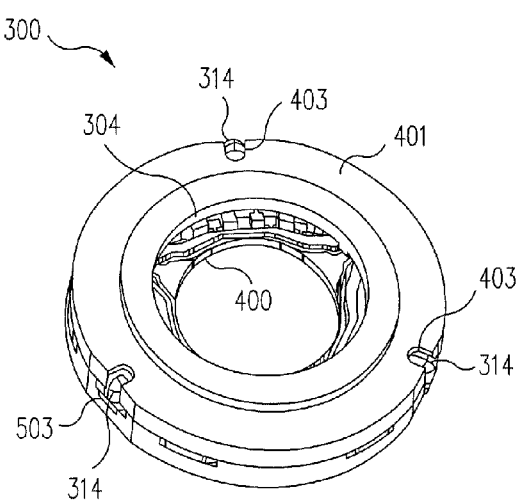
FIG. 30 is a perspective view of the actuator module, fully assembled, in accordance with an embodiment.
Figure 34:
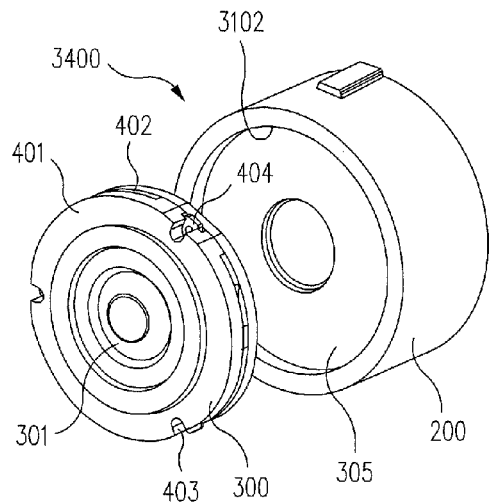
FIG. 34 is an exploded perspective view of a second example embodiment of a lens barrel having an actuator module disposed therein in accordance with an embodiment of the present invention, showing a plurality of first optical elements disposed in a barrel thereof and a second optical element mounted within an actuator module thereof, in accordance with an embodiment.
Figure 35:
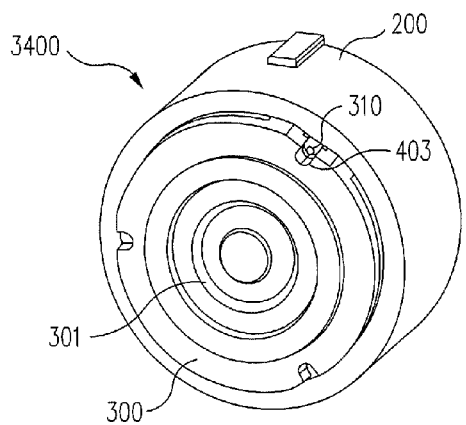
FIG. 35 is a perspective view of the second lens barrel, partially assembled, in accordance with an embodiment.
Figure 36:
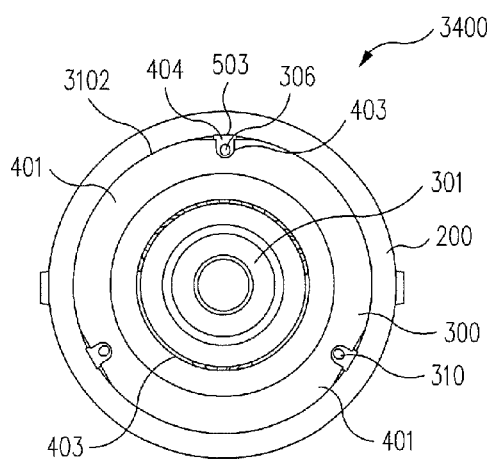
FIG. 36 is a front end elevation view of the partially assembled second lens barrel, showing circumferential surfaces of radial tabs of the actuator device being used to position the optical axis of the first lens concentrically within the barrel and coaxial with the optical axes of the second lens group, in accordance with an embodiment.
Figure 37:
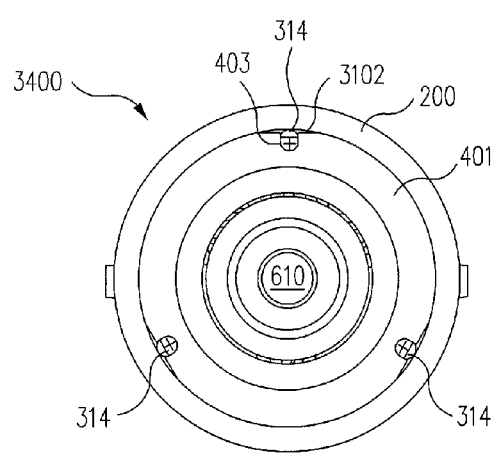
FIG. 37 is a front end elevation view of the second lens barrel, fully assembled, in accordance with an embodiment.

FIG. 27 is an exploded perspective view of the actuator module 300 of FIG. 4, FIG. 28 is a perspective view of the actuator module 300 partially assembled, FIG. 29 is a front end elevation view of the actuator module 300 partially assembled, and FIG. 30 is a perspective view of the actuator module 300 fully assembled. As illustrated in these figures, the actuator module 300 includes many of the features of the first lens barrel 200 described above, and includes, instead of the stationary lens 302 disposed immediately adjacent to the actuator device 400, a rear cover (e.g., a lower module cover or housing) 402 having a central opening 2702 and a plurality of raised actuator device mounting features 308 and forwardly protruding alignment pins 306 disposed symmetrically around an outer margin of its front surface.

An actuator device 400 is mounted on the raised mounting features 308 on the front surface of the rear cover 402, e.g., with an adhesive. The actuator device 400 includes a central opening 405 and radial tabs 404 disposed symmetrically around an outer periphery thereof. As above, each tab 404 has an arcuate outer circumferential surface 503 and an alignment aperture 310 disposed therein.

The interrelationship between the tabs 404 and alignment pins 306, circumferential surfaces 503 and alignment apertures 310 is more clearly illustrated in FIG. 31, which is an enlarged partial front end elevation view of the actuator module 300 installed concentrically within a lens barrel 200, showing a radially extending tab 404 on the actuator device 400 being used both as an alignment mechanism and as an electrical contact pad of the actuator module 300. In particular, the actuator device 400 is attached to the raised mounting features 308 on the front surface of the rear cover 402 such that each of the alignment pins 306 is engaged in a corresponding one of the alignment apertures 310, the tab-shaped mounting features 308 are recessed in respective ones of the recesses 504 of the actuator device 400, and the respective central openings 2702 and 405 of the rear cover 402 and the actuator device 400 are thereby aligned concentrically with each other. Additionally, when the actuator module 300 is then inserted into the annular lens barrel 200, the arcuate outer circumferential surfaces 503 of the tabs 404 respectively abut an inner surface 3102 of the lens barrel 200 so as to precisely align the actuator module 300 concentrically within the lens barrel 200.

The actuator module 300 includes a front cover 401 which is very similar to the front cover 401 of the first lens barrel 200 described above, in that it may include a plurality of raised actuator device mounting features 308 on its rear surface, a central opening 304 and a plurality of radial slots 403 disposed symmetrically around an outer periphery thereof. As in the first lens barrel 200 above, the front cover 401 may be attached to the raised mounting features 308 on the front surface of the actuator device 400, e.g., with an adhesive, such that each of the radial slots 403 exposes a front surface of a respective one of the tabs 404, and the central opening 304 of the front cover 401 is aligned concentrically with the respective central openings 2702 and 405 of the rear cover 402 and the actuator device 400.

As illustrated in FIGS. 32 and 33, external power and ground signals for controlling the actuator module 300 can be conveyed into the actuator module 300 in a manner similar to that described above in connection with the first lens barrel 200 and FIG. 26. In the example embodiments illustrated in FIGS. 32 and 33, a wire or a flexible circuit board 312 carrying, for example, an electrical ground or power signal, can be electrically connected to the conductive front surfaces of one or more of the radial tabs 404 by way of, e.g., a bolus 314 of an electrically conductive adhesive disposed within the radial slots 403 in the front cover 401 and upon the front surfaces of the tabs 404.

As illustrated in FIGS. 34-37, the actuator module 300 described above can be used to confect a second example lens barrel assembly 3400 in accordance with an embodiment of the present invention. Like the first lens barrel assembly 201 above, the second lens barrel 3400 comprises an annular lens barrel 200 incorporating a plurality of stationary lenses 302 (see FIG. 3B). The actuator module 300 is installed into the barrel 200 in front of the stationary lenses 302, for example, by bonding a rear surface of the rear cover 402 to a front surface of the immediately adjacent stationary lens 302 with an adhesive. As discussed above in connection with FIG. 31, in this embodiment, the outer circumferential surfaces 503 of the tabs 404 respectively abut an inner surface 3102 of the barrel 200 and serve to precisely align the actuator module 300 concentrically within the lens barrel 200.

As in the first lens barrel 200 described above, some or all of the lens barrel 200, movable and stationary lenses 301, 302, annular lens holders and the front and rear covers 401 and 402 may comprise a plastic material.

As discussed above in connection with FIGS. 20-23 and FIG. 31, the actuator device 400 may be aligned concentrically and rotationally within the lens barrel 200 (or an actuator module 300) using the radially extending tabs 404 of the actuator device 400, i.e., by attaching the actuator device 400 to raised mounting features 308 on a front surface 305 of the adjacent stationary lens 302 of the lens barrel 200 (or the rear cover 402 of the actuator module 300) using, for example, an adhesive, such that each of the alignment pins 306 on the front surface of the stationary lens 302 (or the actuator module rear cover 402) is engaged in a corresponding one of the alignment apertures 310 in the tabs 404, and the arcuate outer circumferential surfaces 503 of the tabs 404 respectively abut the cylindrical inner surface 3102 of the lens barrel 200 and thereby align both the actuator device and module 300 concentrically and rotationally within the lens barrel 200. While this alignment arrangement is satisfactory for most applications, it is possible in the case of extremely miniaturized applications that, when the size of the alignment pins 306 is reduced correspondingly, they may become too small to be manufactured reliably using, e.g., conventional plastic injection molding techniques, and because of their corresponding increased fragility, may be subject to being easily damaged when inserted into a corresponding alignment aperture 310 of a tab 404 made of a relatively harder material, e.g., silicon.

Figure 38:
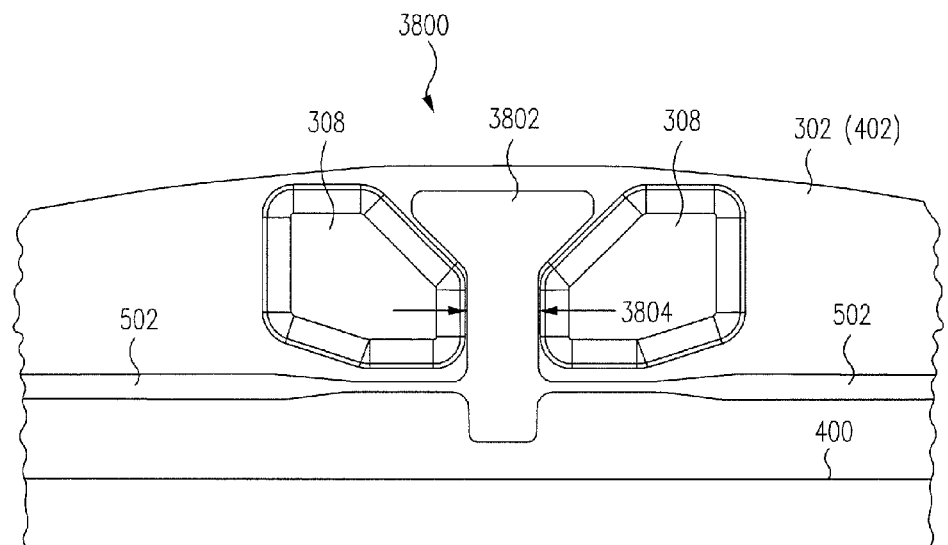
FIG. 38 is an enlarged partial front end elevation view of the actuator module, showing a another embodiment of a radially extending tab on the actuator device being used as a mechanism for concentrically aligning of the actuator device within a lens barrel and optionally as an electrical contact pad of the module, in accordance with an embodiment.
Figure 39:
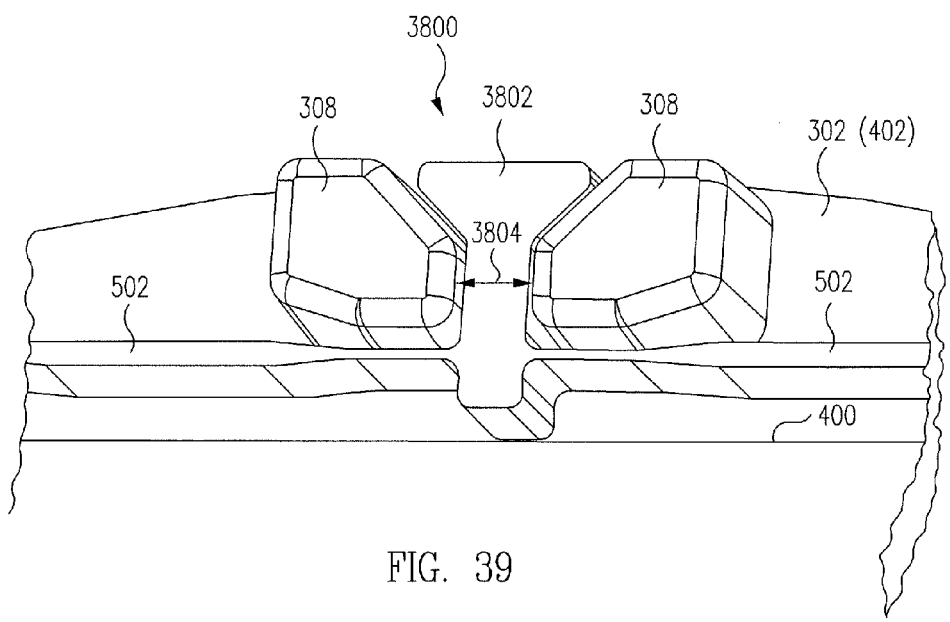
FIG. 39 is a partial perspective view of the actuator module of FIG. 38.

An alternative embodiment of an actuator device 400 alignment arrangement 3800 that avoids the foregoing problems is illustrated in the enlarged partial front end elevation and perspective views of FIGS. 38 and 39, respectively. As may be seen in these figures, unlike the alignment arrangement illustrated in FIG. 31, the alternative alignment feature 3800 replaces the alignment pins 306 and corresponding alignment apertures 310 in the tabs 404 with tabs 3802 (e.g., radial tabs) that respectively engage within corresponding complementary slots 3804, each defined by a pair of raised mounting features 308, or "mesas" respectively disposed on opposite sides of the tabs 3802. As discussed above, in a lens barrel 200 embodiment, the raised mounting features 308 may be formed on the front surface of an adjacent stationary lens 302 (see, e.g., FIG. 3B), and in an actuator module 300 embodiment, may be formed on the front surface of the rear cover 402 of the module 300 (see, e.g., FIG. 27).

In the particular "bar-in-slot" example embodiment illustrated in FIGS. 38 and 39, there are three radially extending tabs 3802, each located 120 degrees apart from the others, at about the center of a corresponding one of the kinematic mount flexures 502 of the actuator device 400 to give the tabs compliance in the radial direction, although in other possible embodiments, the number, mounting and angular spacing of the tabs 3802 can vary, depending on the application at hand. In one advantageous embodiment, the tabs 3802 may comprise silicon that is formed, together with the flexure 502 and the balance of the actuator device 400, using well known photolithographic techniques.

Figure 40:
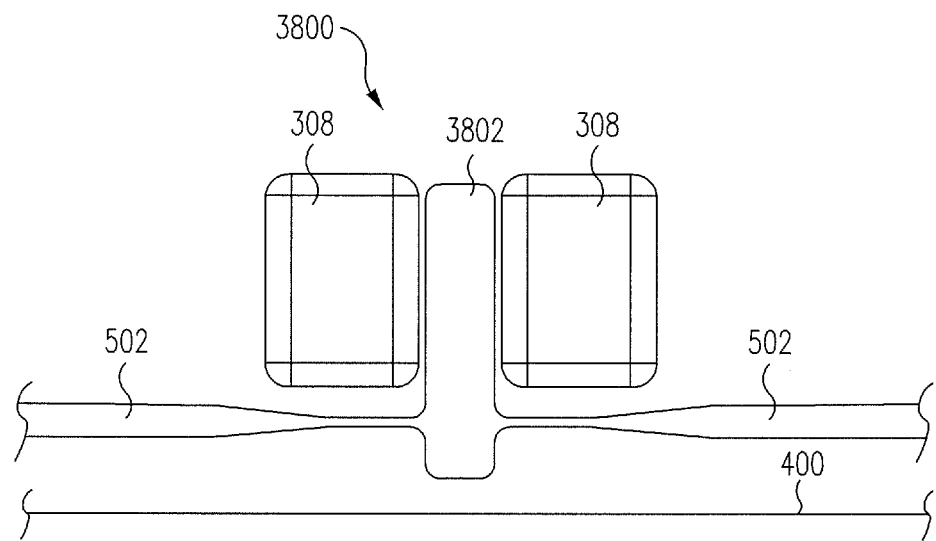
FIG. 40 is an enlarged partial front end elevation view of the actuator module, showing another embodiment of a radially extending tab on the actuator device being used as a mechanism for concentrically aligning of the actuator device within a lens barrel and optionally as an electrical contact pad of the module, in accordance with an embodiment.
Figure 41:
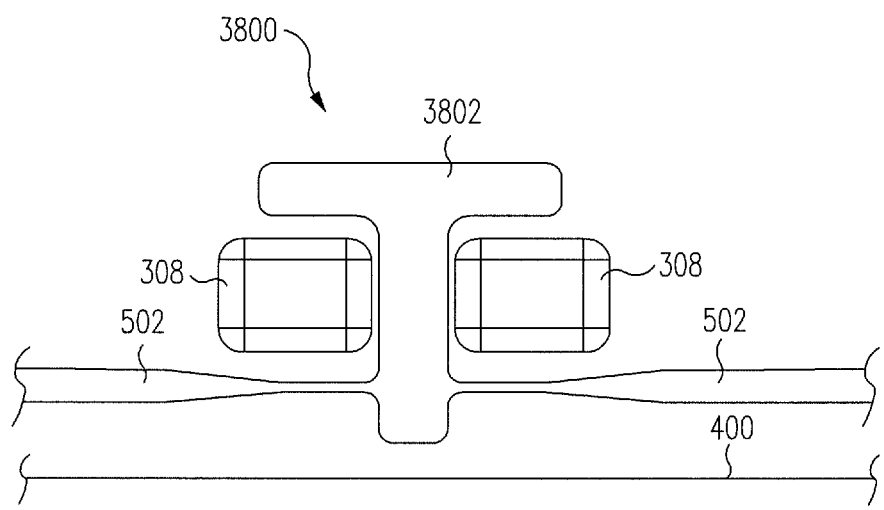
FIG. 41 is an enlarged partial front end elevation view of the actuator module, showing a alternative embodiment of a radially extending tab on the actuator device being used as a mechanism for concentrically aligning of the actuator device within a lens barrel and optionally as an electrical contact pad of the module, in accordance with an embodiment.

As shown in FIGS. 38 and 39, the tabs 3802 comprise a lower, radially extending, bar-like "leg" portion and an upper, circumferentially extending cross-bar or "head" portion that is wider than the lower portion. The upper side wall surfaces of the kinematic mount flexure 502 cooperate with the lower side wall surfaces of the raised mounting features 308, and in embodiments having a head portion, the lower sidewall surfaces of the wider head portion of the tab 3802 cooperate with the opposing upper sidewall surfaces of the raised mounting features 308, to position the actuator device 400 in the radial direction. The sidewalls of the lower portion of the tab 3802 cooperate with the opposing inner sidewalls of the mounting features 308 to position the device 400 in the circumferential, or rotational direction, both relative to the adjacent component, i.e., the stationary lens 302 or the actuator module rear cover 402. The leg portions of the tabs 3802 may have sidewalls that are generally parallel to each other, resulting in a generally "I"-shaped tab 3802, such as that illustrated in FIG. 40. Alternatively, the tabs 3802 may include a transverse head portion that is wider than the leg portion, resulting in a generally "T"-shaped tab 3802, such as that illustrated in FIG. 41, or as illustrated in FIGS. 38 and 39, may have sidewalls that are both parallel and angled relative to each other to form a wider head portion, resulting in a generally "Y"-shaped tab 3802 for various examples of embodiments. In any case, the complementary sidewalls of the slots 3804 are preferably configured to closely match the outlines of the complementary sidewalls of the tabs 3802.

The advantages of the alignment arrangement 3800 illustrated in FIGS. 38 and 39 are several, including that the raised mounting features 308 used to define the slot 3804 can be made much larger than the alignment pins 306 of FIG. 31, and hence, much more robust, e.g., for injection molding purposes. Also, it is possible to maintain a higher accuracy for the width of the slot 3804 because this feature is precisely defined by the steel of the mold in which it is formed, and around which the plastic of the mounting features 308 contract. Additionally, if the sidewalls of the tabs 3802 are angled and the tabs are arranged at angular increments of 90 degrees or greater, the actuator device 400 is inherently self-centering, since the material of the raised features 308 will expand during the thermal curing of a mounting adhesive, and any free play will be thereby taken up, forcing the tabs 3802 to precisely the midpoint between the raised mounting features 308. Alternatively, if the sidewalls of the tabs 3802 are angled, a larger gap between the mounting features 308 can be allowed for a desired final centering accuracy.

As discussed above, in embodiments in which the actuator device 400 is made of an electrically conductive material, e.g., a semiconductor material, such as silicon, the tabs 3802, including the front surfaces thereof, will also be electrically conductive. Alternatively, the front surface of at least one of the tabs 3802 may be made electrically conductive by plating it with an electrically conductive material, such as gold, monocrystalline silicon or polycrystalline silicon. In either case, as discussed above, the electrically conductive front surfaces of the tabs 3802 provide a convenient mechanism for conveying external ground and power signals to the actuators 550 of the actuator device 400.

Although the actuator disclosed herein is described as a MEMS actuator, such description is by way of example only and not by way of limitation. Various embodiments may include non-MEMS actuators, components of non-MEMS actuators, and/or features of non-MEMS actuators.

Thus, an actuator suitable for use in a wide variety of different electronic devices may be provided. Motion control of the actuator and/or items moved by the actuator may also be provided. As such, an enhanced miniature camera for use in electronic devices may be provided.

According to various embodiments, smaller size and enhanced shock resistance for miniature cameras are provided. Enhanced fabrication techniques may be used to provide these and other advantages. Thus, such fabrication techniques may additionally enhance the overall quality and reliability of miniature cameras while also substantially reducing the cost thereof.

Where applicable, the various components set forth herein may be combined into composite components and/or separated into sub-components. Where applicable, the ordering of various steps described herein may be changed, combined into composite steps, and/or separated into sub-steps to provide features described herein.

Embodiments described herein illustrate but do not limit the disclosure. It should also be understood that numerous modifications and variations are possible in accordance with the principles of the disclosure.

What is claimed is:

1. A method for making an apparatus, the method comprising:
   forming an actuator device with at least one actuator having components that move rotationally relative to each other about a pivot axis extending between opposing ones of the components, a platform rotatably coupled to the at least one actuator and a plurality of radially extending tabs disposed around an outer periphery thereof;
   disposing an optical element on or in a central opening of the platform;
   providing an annular structure having a front surface with plurality of slots disposed around a central opening therein, each slot having sidewalls complementary in configuration to corresponding sidewalls of a corresponding one of the tabs; and
   inserting respective ones of the tabs into corresponding ones of the slots such that an optical axis of the optical element is disposed coaxially with a central axis of the central opening of the annular structure.

2. The method of claim 1, further comprising:
   providing a front cover having a central opening and a plurality of radial slots disposed around an outer periphery thereof; and
   attaching the front cover to a front surface of the actuator device such that each of the radial slots exposes a front surface of a respective one of the plurality of radially extending tabs and a central axis of the central opening of the front cover is aligned coaxially with the optical axis of the optical element.

3. The method of claim 2, wherein
   a front surface of at least one of the plurality of radially extending tabs is plated or coated with an electrically conductive material comprising one or more of gold, monocrystalline silicon and/or polycrystalline silicon, and
   the components of the at least one actuator move rotationally relative to each other about the pivot axis and wherein the pivot axis extends between opposing edges of the components.

4. The method of claim 3, further comprising electrically connecting a wire or a flexible circuit board to the surface through a corresponding one of the radial slots.

5. The method of claim 3, wherein the connecting comprises adhering the wire or flexible circuit board to the surface with an electrically conductive adhesive.

6. The method of claim 1, wherein:
   the actuator device comprises a single monolithic structure and the forming comprises utilizing photolithography techniques;
   the platform is coupled to the at least one actuator by a hinge flexure; and
   the optical element is a first optical element.

7. The method of claim 6, further comprising disposing a second optical element within the central opening of the annular structure such that an optical axis of the second optical element is disposed coaxially with the optical axis of the first optical element.

8. The method of claim 6, further comprising:
   providing an annular lens barrel having a central opening;
   disposing a second optical element within the central opening of the lens barrel; and
   inserting the annular structure into the central opening of the lens barrel such that outer circumferential surfaces of the tabs abut with an inner circumferential surface of the lens barrel and coaxially align the optical axis of the first optical element with the optical axis of the second optical element.

9. The method of claim 1, further comprising incorporating the apparatus into a lens barrel of a miniature camera.

10. The method of claim 9, further comprising incorporating the miniature camera into an electronic device.

11. The method of claim 9, further comprising utilizing the at least one actuator to effect at least one of focusing and zooming of the miniature camera.

12. An apparatus, comprising:
    an actuator device with at least one actuator having components that move rotationally relative to each other about a pivot axis extending between opposing edges of the components, a platform rotatably coupled to each of the actuators, and a plurality of radially extending tabs disposed around an outer periphery thereof; and
    an optical element disposed on or within an opening in the platform.

13. The apparatus of claim 12, wherein actuation of the at least one actuator causes the platform and the optical element to move conjointly with translational movement along an optical axis of the optical element.

14. The apparatus of claim 12, further comprising:
    an annular structure having a front surface with plurality of slots disposed around a central opening therein, each slot having sidewalls complementary in configuration to corresponding sidewalls of a corresponding one of the tabs,
    wherein respective ones of the tabs are disposed in corresponding ones of the slots such that an optical axis of the optical element is disposed coaxially with a central axis of the central opening of the annular structure.

15. The device of claim 14, further comprising;
    a front cover having a central opening and a plurality of radial slots disposed around an outer periphery thereof,
    wherein the front cover is attached to a front surface of the actuator device such that each of the radial slots exposes a front surface of a respective one of the tabs, and
    a central axis of the central opening of the front cover is aligned coaxially with the optical axis of the optical element.

16. The apparatus of claim 14, wherein:
    the optical element comprises a first optical element: and
    further comprising a second optical element disposed within the central opening of the annular structure such that an optical axis of the second optical element is disposed coaxially with the optical axis of the one first optical element.

17. The apparatus of claim 16, further comprising:
    an annular lens barrel having a central opening and the second optical element disposed within the central opening such that an optical axis of the second optical element is aligned coaxially with a central axis of the central opening,
    wherein the annular structure is disposed within the central opening of the lens barrel such that outer circumferential surfaces of the tabs abut with an inner circumferential surface of the lens barrel and coaxially align the optical axis of the optical element with the optical axis of the second optical element.

18. The apparatus of claim 16, wherein at least one of the first and the second optical elements comprises a lens, a group of lenses, a fixed aperture, a variable aperture, a shutter, a mirror, a prism, a spatial light modulator, a diffraction grating, a laser, an LED and/or a light detector.

19. The apparatus of claim 14, wherein each of the slots is defined by a pair of raised mounting features disposed on the front surface of the annular structure and the platform is coupled to each of the actuators by a hinge flexure.

20. The apparatus of claim 12, wherein rotational movement of the at least one actuator causes the platform and the first optical element to move conjointly with purely translational movement along an optical axis of the first optical element.

21. A lens barrel incorporating the apparatus of claim 12.

22. A miniature camera incorporating the lens barrel of claim 21.

23. An electronic device incorporating the miniature camera of claim 22.

24. A cellular telephone, a laptop computer, a personal digital assistant or a surveillance device incorporating the apparatus of claim 12.

* * * * *